(12) United States Patent
Ashmore

(10) Patent No.: US 10,884,013 B2
(45) Date of Patent: Jan. 5, 2021

(54) MONITORING DEVICE WITH MODULAR ASSEMBLY

(71) Applicant: Bradley Charles Ashmore, Mountain View, CA (US)

(72) Inventor: Bradley Charles Ashmore, Mountain View, CA (US)

( * ) Notice: Subject to any disclaimer, the term of this patent is extended or adjusted under 35 U.S.C. 154(b) by 0 days.

(21) Appl. No.: 16/805,359

(22) Filed: Feb. 28, 2020

(65) Prior Publication Data

US 2020/0200790 A1 Jun. 25, 2020

Related U.S. Application Data

(63) Continuation of application No. 16/415,115, filed on May 17, 2019, now Pat. No. 10,598,683, which is a continuation of application No. 15/397,426, filed on Jan. 3, 2017, now Pat. No. 10,324,104.

(60) Provisional application No. 62/274,447, filed on Jan. 4, 2016.

(51) Int. Cl.
| | | |
|---|---|---|
| *G01P 13/00* | (2006.01) | |
| *G01P 13/02* | (2006.01) | |
| *G01P 5/14* | (2006.01) | |

(52) U.S. Cl.
CPC ............ *G01P 5/14* (2013.01); *G01P 13/0066* (2013.01); *G01P 13/02* (2013.01); *G01P 13/025* (2013.01)

(58) Field of Classification Search
CPC ...... G01P 13/0066; G01P 13/025; G01P 5/14; G01P 13/02; G01P 1/00; G01P 13/045
USPC .......... 73/861; 700/282; 702/45, 47, 50, 100
See application file for complete search history.

(56) References Cited

U.S. PATENT DOCUMENTS

| | | |
|---|---|---|
| 4,393,451 A | 7/1983 | Barker |
| 4,453,419 A | 6/1984 | Engelke |
| 5,231,596 A | 7/1993 | Nakazawa et al. |
| 5,297,421 A | 3/1994 | Hosonuma et al. |
| 5,423,209 A | 6/1995 | Nakaya et al. |
| 5,485,843 A | 1/1996 | Greenstein et al. |
| 5,832,411 A | 11/1998 | Schatzmann et al. |

(Continued)

FOREIGN PATENT DOCUMENTS

WO  2016/135061 A1  9/2016

OTHER PUBLICATIONS

International Search Report and Written Opinion dated Mar. 23, 2018, from the ISA/US, for International Patent Application No. PCT/US18/12109 (filed Jan. 2, 2018), 11 pages.

(Continued)

*Primary Examiner* — John E Breene
*Assistant Examiner* — Jeffrey P Aiello
(74) *Attorney, Agent, or Firm* — Ascenda Law Group, PC

(57) ABSTRACT

A monitoring device includes a cavity assembly with a plurality of cavities. Openings of the plurality of cavities are distributed about a flow-facing surface of the cavity assembly. A gas pressure sensor is disposed within each of the cavities, and is configured to measure an absolute pressure of a gas flow which flows past the monitoring device. Gas pressure measurements from the pressure sensors may be used to determine a flow speed and a flow direction of the gas flow. More specifically, a mapping may be used to map the logarithm of the difference between the maximum and minimum pressures to a flow speed. Further, a lookup table may be used to map a pattern of pressure measurements to a flow direction.

20 Claims, 20 Drawing Sheets

(56) References Cited

U.S. PATENT DOCUMENTS

| | | | | |
|---|---|---|---|---|
| 5,929,331 | A * | 7/1999 | Kinser | G01P 5/165 73/147 |
| 6,237,426 | B1 | 5/2001 | Gryc et al. | |
| 6,601,460 | B1 | 8/2003 | Materna | |
| 7,093,483 | B2 | 8/2006 | Corey et al. | |
| 8,687,175 | B2 | 4/2014 | Diatzikis et al. | |
| 9,279,666 | B1 * | 3/2016 | Balasubramaniam | G01B 11/165 |
| 9,476,900 | B2 | 10/2016 | Akada | |
| 2002/0100316 | A1 * | 8/2002 | James | G01F 1/6845 73/204.26 |
| 2006/0060001 | A1 * | 3/2006 | Kurtz | G01F 1/46 73/861.65 |
| 2007/0256506 | A1 | 11/2007 | Sette | |
| 2009/0071258 | A1 * | 3/2009 | Kouda | A61M 1/3641 73/723 |
| 2010/0006670 | A1 * | 1/2010 | Bourrilhon | B05B 7/0475 239/240 |
| 2011/0094311 | A1 | 4/2011 | Khimji | |
| 2012/0224955 | A1 * | 9/2012 | Vine | F04D 17/122 415/208.1 |
| 2013/0270446 | A1 * | 10/2013 | Dardona | G01T 7/00 250/382 |
| 2014/0123751 | A1 | 5/2014 | Lu | |
| 2014/0124057 | A1 * | 5/2014 | Freund | G01F 1/34 137/455 |
| 2014/0130608 | A1 | 5/2014 | Adams | |
| 2014/0152468 | A1 | 6/2014 | Obenchain | |
| 2015/0017619 | A1 | 1/2015 | Ashmore | |
| 2015/0320950 | A1 | 11/2015 | Borner | |
| 2015/0364315 | A1 * | 12/2015 | Ramsey | H01J 49/424 250/282 |
| 2015/0377662 | A1 | 12/2015 | Ray | |
| 2016/0131013 | A1 * | 5/2016 | Yi | F01N 13/08 60/274 |
| 2016/0377469 | A1 * | 12/2016 | Teli | G01F 3/30 73/234 |
| 2017/0192031 | A1 | 7/2017 | Ashmore | |
| 2017/0197056 | A1 | 7/2017 | Van Schalkwyk et al. | |

OTHER PUBLICATIONS

Notice of Allowance dated Feb. 6, 2019, for U.S. Appl. No. 15/397,426, filed Jan. 3, 2017, 8 pages.
Amendment filed Jan. 10, 2019, for U.S. Appl. No. 15/397,426, filed Jan. 3, 2017, 9 pages.
Non-Final Office Action dated Dec. 20, 2018, for U.S. Appl. No. 15/397,426, filed Jan. 3, 2017, 11 pages.
Supplemental Amendment filed Oct. 3, 2018, for U.S. Appl. No. 15/397,426, filed Jan. 3, 2017, 3 pages.
Amendment filed Sep. 19, 2018, for U.S. Appl. No. 15/397,426, filed Jan. 3, 2017, 6 pages.
Non-Final Office Action dated Sep. 6, 2018, for U.S. Appl. No. 15/397,426, filed Jan. 3, 2017, 11 pages.
International Preliminary Examination Report on Patentability dated Jul. 18, 2019, from the International Bureau of WIPO, for International Application No. PCT/US2018/012109 (filed Jan. 2, 2018), 10 pages.
Notice of Allowance dated Nov. 12, 2019, for U.S. Appl. No. 16/415,115, filed May 17, 2019, 9 pages.
Amendment filed Oct. 22, 2019, for U.S. Appl. No. 16/415,115, filed May 17, 2019, 10 pages.
Non-Final Office Action dated Jul. 31, 2019, for U.S. Appl. No. 16/415,115, filed May 17, 2019, 15 pages.

* cited by examiner

Model Training

Model Application

MONITORING DEVICE WITH MODULAR ASSEMBLY

RELATED APPLICATIONS

This application is a Continuation Application of U.S. application Ser. No. 16/415,115, filed on 17 May 2019 (now issued as U.S. Pat. No. 10,598,683), which is a Continuation Application of U.S. application Ser. No. 15/397,426, filed on 3 Jan. 2017 (now issued as U.S. Pat. No. 10,324,104), which is a non-provisional patent application of and claims priority to U.S. Provisional Application No. 62/274,447, filed 4 Jan. 2016, each of which is incorporated by reference herein.

FIELD OF THE INVENTION

The present invention relates to determining the speed and direction of a gas flow, and more specifically relates to determining the speed and direction of the gas flow based on absolute pressure measurements distributed about a surface of a cavity assembly.

BACKGROUND

The measurement of the speed and direction of a gas flow may be performed in a variety of applications. Some of these applications include measuring the speed and direction of wind, measuring the speed of air through a ventilation system, etc.

In a mechanical approach for performing such measurements, a propeller or spinning cups of a cup anemometer may spin in response to a gas flow, and the rotational speed of the propeller or spinning cups may be used to infer the flow speed. To additionally determine wind direction, a wind vane may be employed. Mechanical devices are generally lower cost than other instruments used to determine the speed and direction of a gas flow. However, mechanical devices have moving parts, and are therefore susceptible to the effects of wear and tear, leading to the degradation and eventual failure of the devices.

In an acoustical approach, an ultrasonic anemometer may be used to measure the speed and direction of a gas flow. Sonic pulses may be transmitted between pairs of transducers and the time of flight of the sonic pulses may be used to infer the speed of a gas flow. If three or more transducers are employed, the direction of a gas flow may be also determined. An ultrasonic anemometer provides the advantages of no moving parts, high accuracy, and reliability, while it has the drawbacks of higher power requirements and higher cost.

Devices other than mechanical and acoustical anemometers for measuring the speed and direction of a gas flow are described herein.

SUMMARY OF THE INVENTION

In accordance with one embodiment of the invention, a monitoring device may be used to determine the speed and direction of a gas flow. The monitoring device may comprise a cavity assembly with a plurality of cavities distributed about a flow-facing surface of the cavity assembly. Each of the cavities may have a first opening which is fluidly coupled to the gas flow. Each of the cavities may also have a second opening configured to receive a pressure sensor. The second openings may be sealed by a surface of a sensor support, on which the pressure sensors are mounted. As such, gas may flow into the cavities, but gas may not flow through the cavities, since the second openings may be sealed by the surface of the sensor support.

The pressure sensors, which may be a micro-electrical mechanical systems (MEMS) based sensor, may measure the absolute pressure of the gas within each of the cavities. Such absolute pressure measurement may be used to approximate the absolute pressure of the gas flow in the proximity of the cavity opening. At a specific time instance, a measurement may be performed by each of the pressure sensors, thereby generating a measurement of the absolute pressure of the gas flow at points distributed about the flow-facing surface of the cavity assembly.

The plurality of absolute pressure measurements may be used to determine the speed and direction of the flow of gas. In one embodiment, the logarithm of the difference between the maximum and minimum pressures may be mapped, via a pre-determined mapping, to a flow speed. In one embodiment, the plurality of absolute pressure measurements (i.e., a "pattern" of pressure measurements) may be mapped, via a lookup table, to a flow direction. In an alternative embodiment, pressure sensors may be ranked by the magnitude of their respective pressure measurements, and the ranking of pressure sensors, may be mapped, via a lookup table, to a flow direction.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
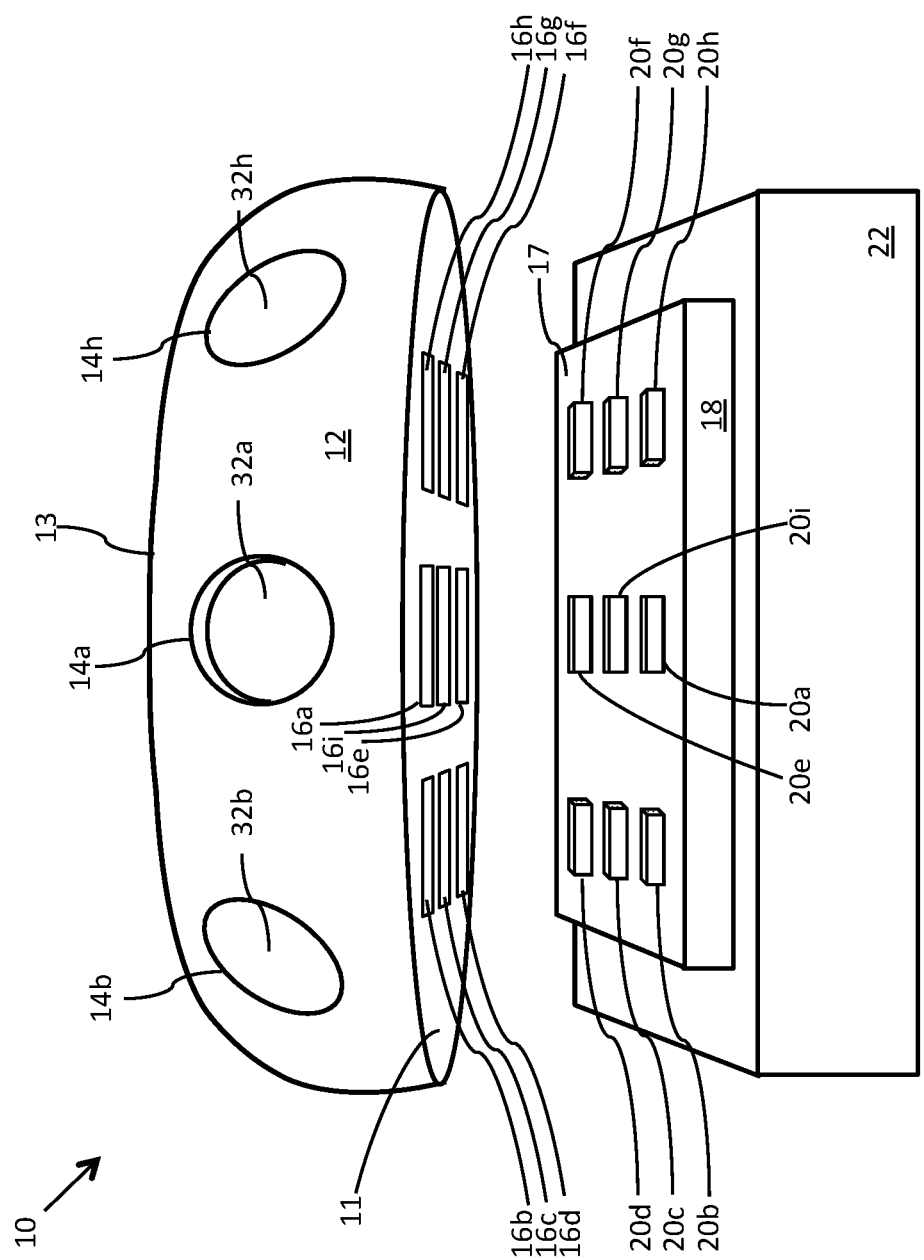
FIG. 1 depicts an exploded view of a monitoring device configured to measure a speed and direction of a gas flow, in accordance with one embodiment.

FIG. 1 depicts an exploded view of monitoring device 10, which is configured to measure a speed and direction of a gas flow, in accordance with one embodiment. The gas flow is not explicitly depicted in FIG. 1, but it is understood that monitoring device 10 is disposed in a gas flow (e.g., the flow of air caused by wind, the flow of air caused by a fan, the flow of air caused by monitoring device 10 traversing a volume of gas, etc.). Monitoring device 10 may comprise cavity assembly 12 with a plurality of cavities 32a-32i, of which only cavities 32b, 32a, and 32h are visible in the exploded view. In the embodiment of FIG. 1, the cavity assembly 12 comprises a total of nine cavities, eight of which are disposed about an "equator" of cavity assembly 12, and one of which is disposed at the "north pole" of the cavity assembly 12 (terms such as "equator" and "north pole" referring to a metaphor in which a planet is likened to the cavity assembly). In a cavity assembly that is not spherically-shaped, a level curve of the surface of the cavity assembly may more generically describe the "equator" of the cavity assembly. While the total number of cavities is an odd number in the embodiment of FIG. 1, the total number of cavities may be an even number in an alternative embodiment (not depicted).

Cavity assembly 12 may comprise sensor-facing surface 11 and flow-facing surface 13. Sensor-facing surface 11 may be a planar surface, and may face pressure sensors 20a-20i (described below). Flow-facing surface 13 may be a three-dimensional surface which is convex and radially symmetric. The shape of flow-facing surface 13 may promote a laminar flow of the gas around cavity assembly 12. A plurality of openings 14a-14i of cavities 32a-32i may be formed on flow-facing surface 13, of which only openings 14b, 14a, 14h are visible in the exploded view. Each of the plurality of openings 14a-14i may fluidly couple cavities 32a-32i to the gas flow. In one embodiment, openings 14a-14i may have the shape of a circle, and the diameter of one of openings 14a-14i may measure 3 mm.

A plurality of pressure sensors 20a-20i may be mounted on a top surface 17 of sensor support 18, and each of sensors 20a-20i may be configured to measure an absolute pressure of the gas flow. An example of a pressure sensor is the DPS310 Digital Barometric Pressure Sensor for Mobile and Wearable Devices, available from Infineon Technologies of Neubiberg, Germany. The dimension of the DPS310 may be 2 mm×2.5 mm×1 mm. An approximation is made that the absolute pressure is substantially constant within each of cavities 32a-32i. Therefore, the absolute pressure measured by a pressure sensor (e.g., one of pressure sensors 20a-20i) deep within a cavity is used to approximate the absolute pressure of the gas flow at the opening of the cavity (e.g., one of openings 14a-14i).

As is noted above, FIG. 1 depicts an "exploded view" of monitoring device 10, in order to depict details that might not be visible if the monitoring device were depicted in its fully assembled state. When the monitoring device 10 is fully assembled (e.g., as in the side view depicted in FIG. 2b), a portion of sensor-facing surface 11 may abut top surface 17 of sensor support 18. A plurality of openings 16a-16i may be formed on sensor-facing surface 11, and each of the openings 16a-16i may be configured to receive one of the plurality of pressure sensors 20a-20i. More specifically, openings 16a-16i may be configured to receive pressure sensors 20a-20i, respectively. Each of openings 16a-16i may have a square shape, a rectangular shape (or other shape), and in the instance that the openings have a square shape, the dimensions of the openings may measure 3 mm by 3 mm. To clarify, while each of cavities 32a-32i includes two openings 14a-14i and 16a-16i, only openings 14a-14i may be open to the gas flow, while openings 16a-16i may be sealed by top surface 17 of sensor support 18. In other words, top surface 17 may form a portion of a wall of each of cavities 32a-32i.

Sensor support 18 may be secured to base portion 22, which may comprise electronic circuitry that is configured to determine a speed and direction of the gas flow from the absolute pressure measurements. Base portion 22 is described in further detail below in FIG. 5.

Figure 2A:
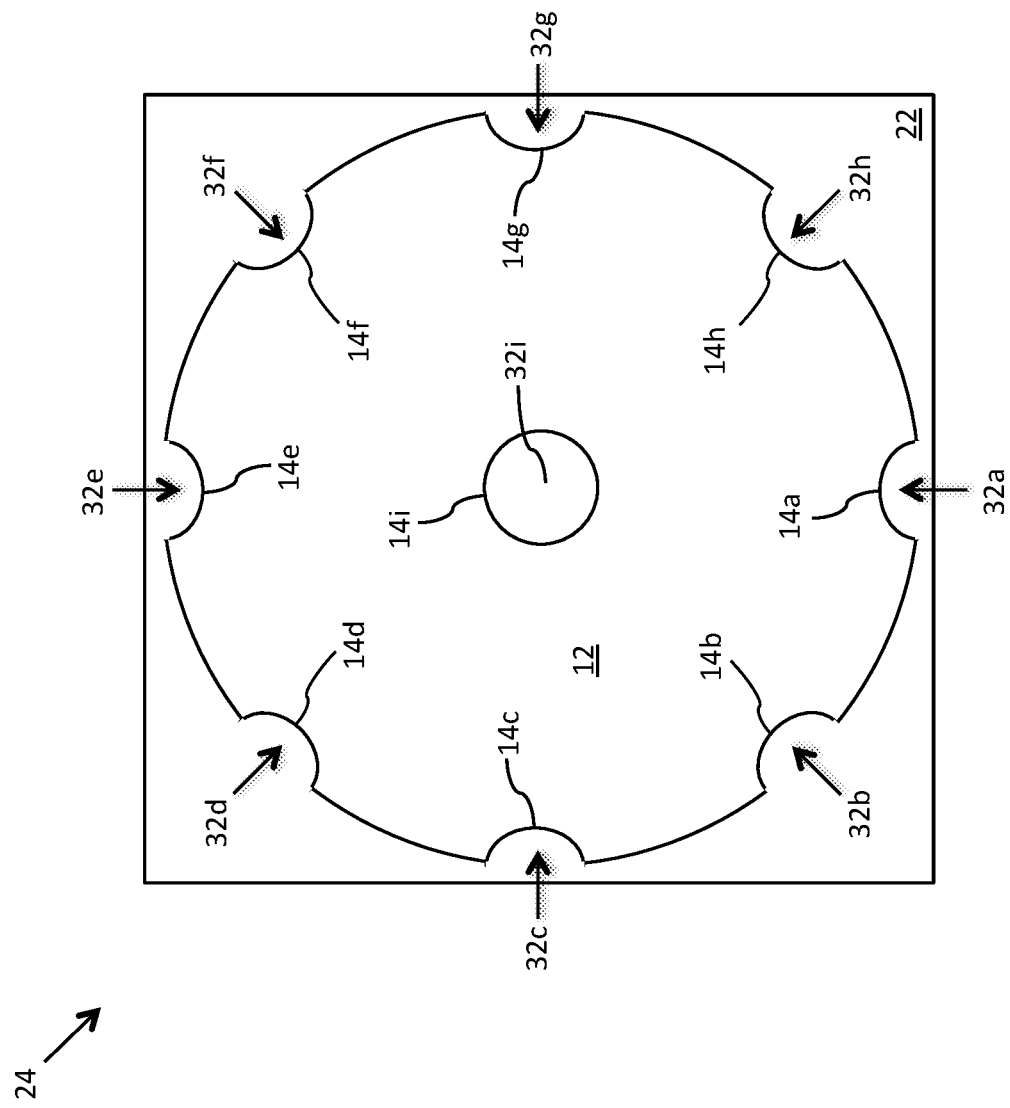
FIG. 2a depicts a top view of the monitoring device, in accordance with one embodiment.

FIG. 2a depicts top view 24 of monitoring device 10, in accordance with one embodiment. In top view 24, opening 14i is visible, as well as openings 14a-14h, which are each partially visible. As shown in FIG. 2a, openings 14a-14h may be evenly distributed about a perimeter of top view 24 of cavity assembly 12. Cavities 32a-32h may comprise a cylindrical channel (not depicted) which penetrates cavity assembly 12 in the direction "parallel to the page" of FIG. 2a, while cavity 32i may comprise a cylindrical channel (not depicted) which penetrates cavity assembly 12 in the direction "perpendicular to the page" of FIG. 2a. Therefore, cavity 32i may comprise a cylindrical channel which is disposed orthogonal to the cylindrical channels of cavities 32a-32h. In one embodiment, the width of cavity assembly 12 (e.g., distance separating opening 14a from opening 14e) may be approximately 20 mm.

Figure 2B:
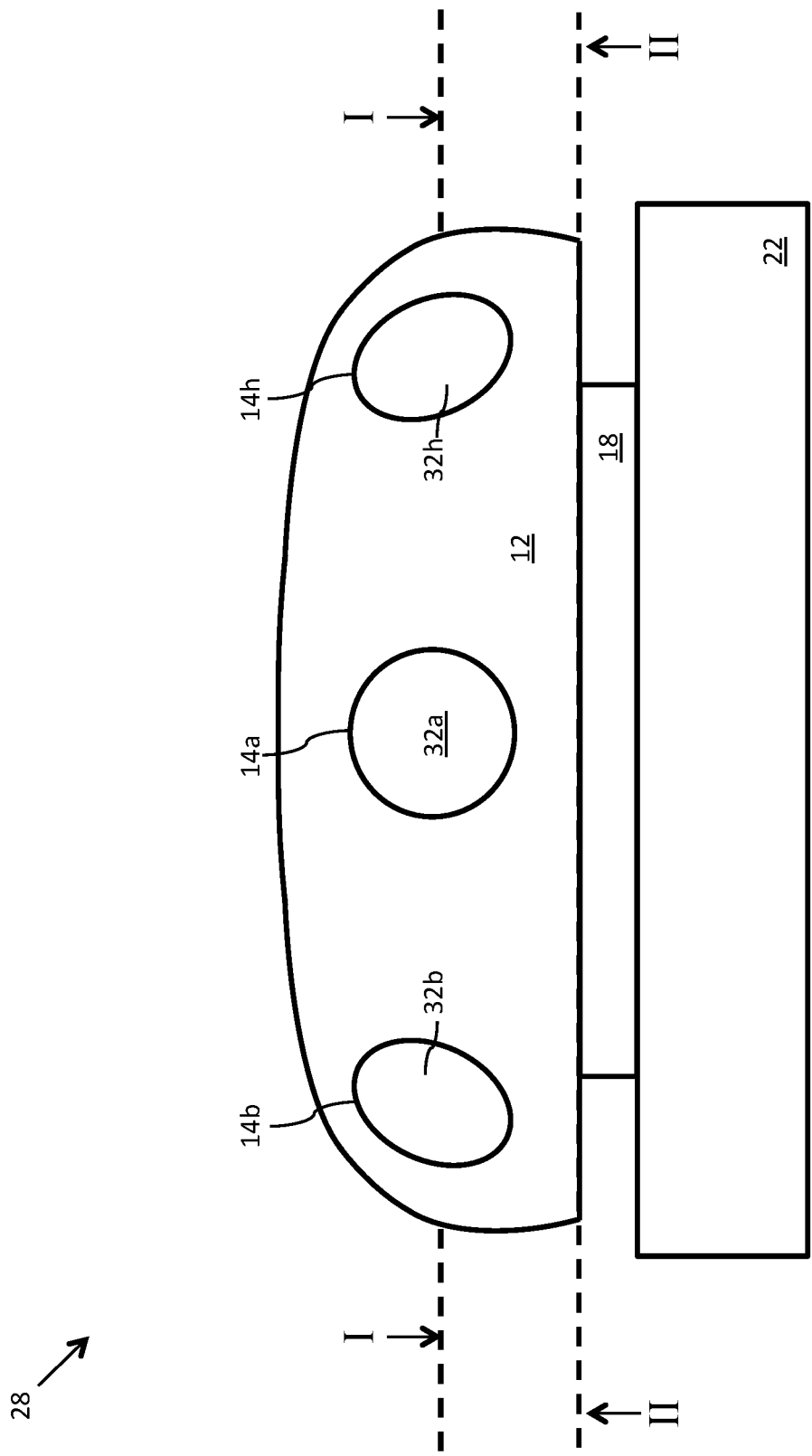
FIG. 2b depicts a side view of the monitoring device, in accordance with one embodiment.
Figure 3:
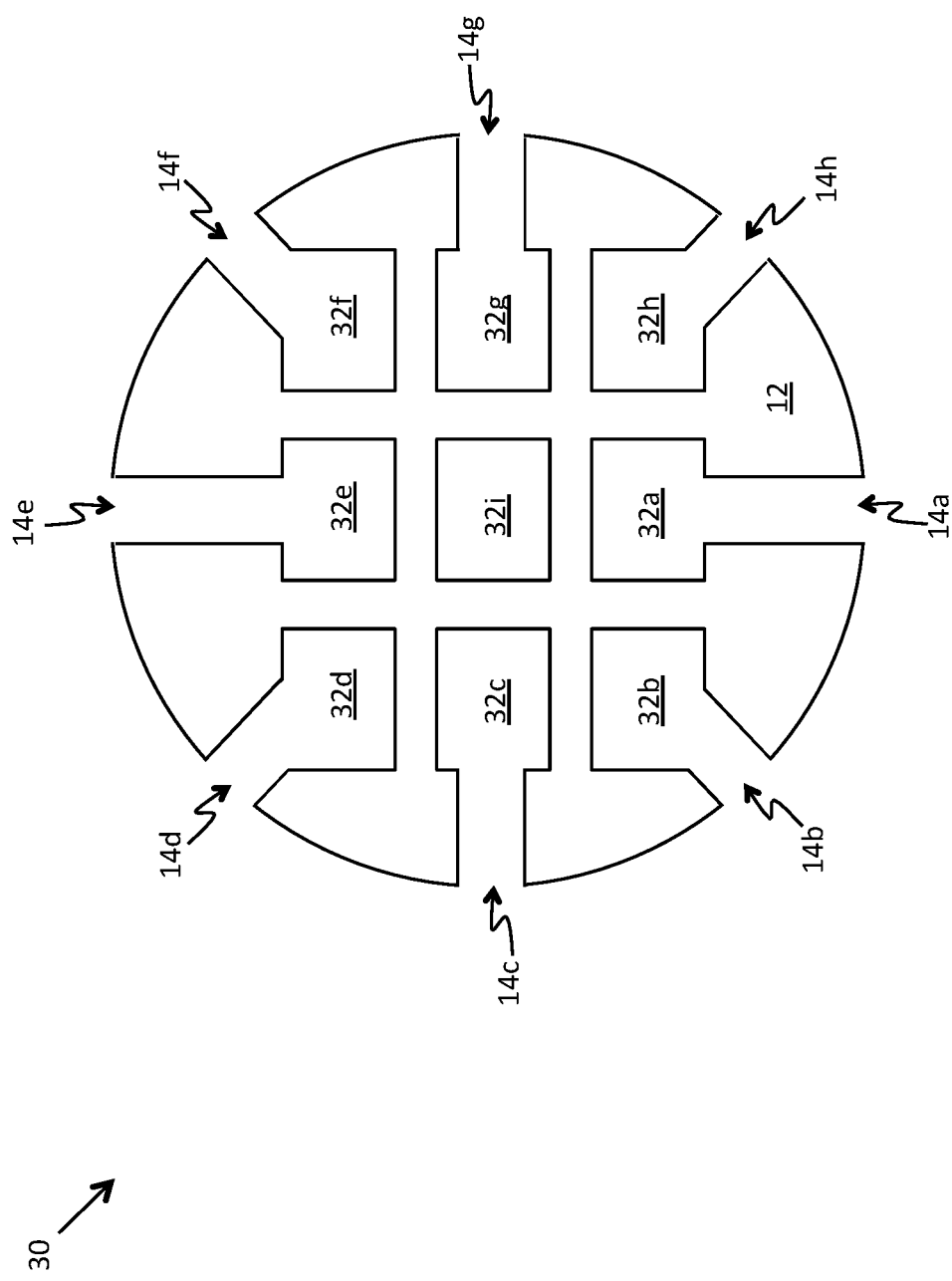
FIG. 3 depicts a cross-sectional view of a cavity assembly of the monitoring device along the line I-I, in accordance with one embodiment.
Figure 4:
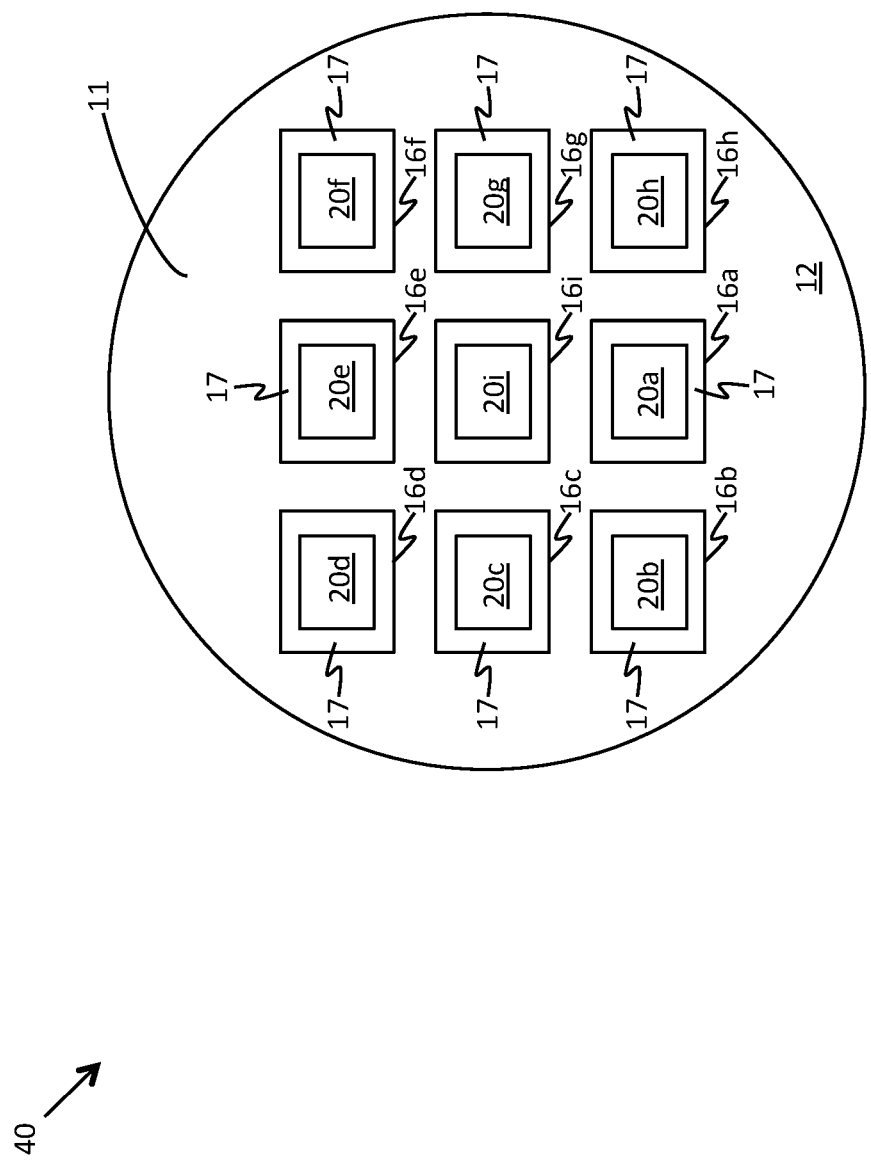
FIG. 4 depicts a cross-sectional view of a cavity assembly of the monitoring device along the line II-II, in accordance with one embodiment.

FIG. 2b depicts side view 28 of monitoring device 10, in accordance with one embodiment. As shown in side view 28, monitoring device 10 may be constructed as a stacked assembly of components (i.e., sensor support 18 disposed between cavity assembly 12 and base portion 22). Of openings 14a-14i, openings 14b, 14a, and 14h may be visible in the side view of FIG. 2b. Likewise, of cavities 32a-32i, cavities 32b, 32a, and 32h may be visible in the side view of FIG. 2b. A cross-section of cavity assembly 12 along line I-I is depicted in FIG. 3, and a cross-section of cavity assembly 12 along line II-II is depicted in FIG. 4. In one embodiment, the height of cavity assembly 12 may measure 6 mm.

FIG. 3 depicts cross-sectional view 30 of cavity assembly 12 along line I-I, in accordance with one embodiment. As depicted in cross-sectional view 30, cavities 32a-32i may be arranged in a grid fashion, and in the embodiment of FIG. 3, may be arranged in a three by three grid. Openings 14a-14h may fluidly couple cavities 32a-32h to the gas flow, respectively. The opening for cavity 32i is not visible in cross-sectional view 30.

FIG. 4 depicts cross-sectional view 40 of cavity assembly 12 along line II-II, in accordance with one embodiment. Openings 16a-16i of sensor-facing surface 11 may be visible in cross-sectional view 40. A portion of top surface 17 of sensor support 18 may be visible within each of openings 16a-16i. Pressure sensors 20a-20i may also be visible within each of openings 16a-16i.

Figure 5:
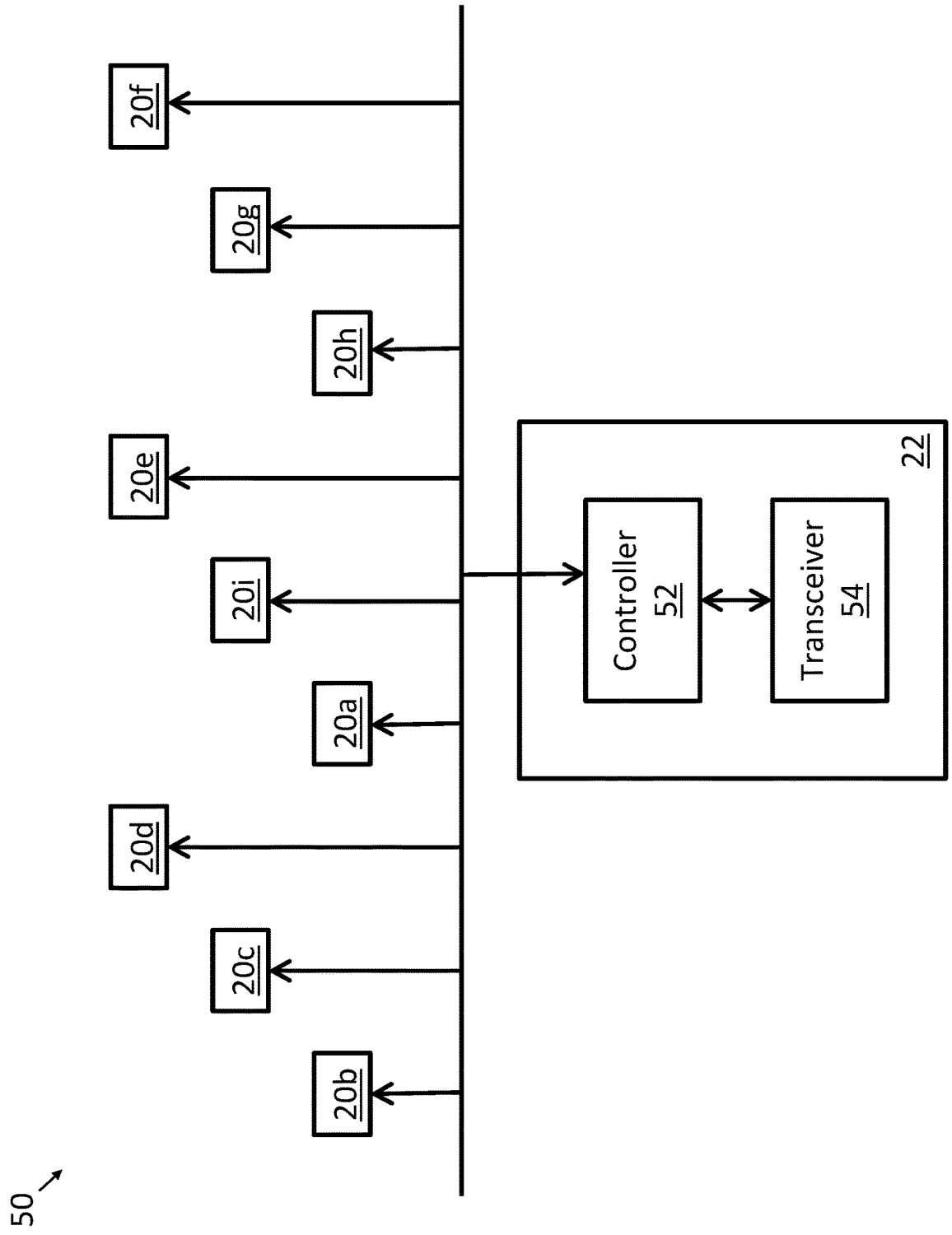
FIG. 5 depicts a block diagram of a plurality of pressure sensors communicatively coupled to a controller of a base portion of the monitoring device, in accordance with one embodiment.

FIG. 5 depicts block diagram 50 of pressure sensors 20a-20i communicatively coupled to controller 52 of base portion 22, in accordance with one embodiment. Controller 52 is configured to, at a particular time instance, receive one absolute gas pressure measurement from each of pressure sensors 20a-20i. The pressure measurements may record, at the particular time instance, the absolute pressure of the gas flow at points spatially distributed about flow-facing surface 13. Controller 52 is configured to determine a speed and a direction of the gas flow from the absolute gas pressure measurements. The specifics of the determination will be explained below in FIGS. 6-10. Transceiver 54 may be communicatively coupled to controller 52, and may be programmed to receive the determined speed and direction of the gas flow from controller 52, and wirelessly transmit such information to a base station located remotely from the monitoring device (not depicted). Transceiver 54 may also be programmed to receive, from the base station, a request for the speed and direction of the gas flow, and transmit such request to controller 52.

Figure 6:
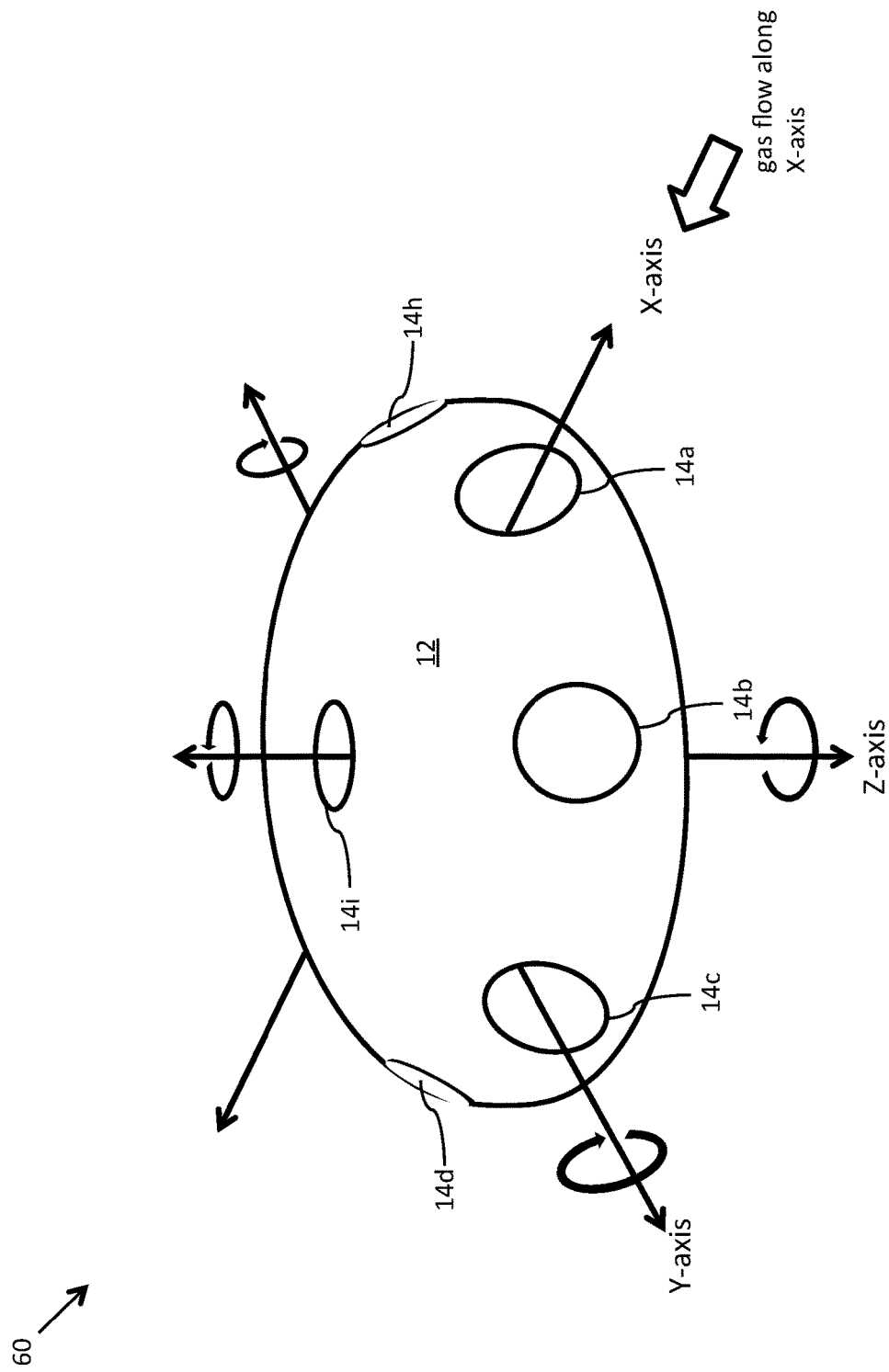
FIG. 6 depicts a perspective view of the cavity assembly of the monitoring device, the cavity assembly being oriented with respect to the X-, Y- and Z-axes, in accordance with one embodiment.

FIG. 6 depicts a perspective view of cavity assembly 12 with respect to the X-, Y- and Z-axes, in accordance with one embodiment. The X-, Y- and Z-axes are depicted to facilitate an explanation of computational fluid dynamic simulations, the results of which are provided in FIGS. 7 and 8. As an overview of the fluid dynamic simulations, gas was simulated to flow along (or parallel to) the X-axis at a specific velocity. The absolute pressure was calculated for each of pressure sensors 20a-20i. The simulations were repeated for various rotational positions of cavity assembly 12 about the Z- and Y-axes. Since the gas flow is symmetric about the X-axis, simulations with rotational positions of cavity assembly 12 about the X-axis were not performed. The results of such simulations were used to develop a relationship between absolute gas pressure measurements and flow speed, and such relationship is depicted in FIG. 9. A more detailed explanation of the simulations and simulation results is now provided.

Figure 7:
FIG. 7 depicts a plot of the logarithm of the difference between the maximum and minimum absolute pressures versus the rotational position of the cavity assembly about the Y-axis angle, in accordance with one embodiment.

To generate the results of FIG. 7, simulations were performed for flow speeds of 2, 3, 4, 5, 10, 15 and 20 m/s. For each of these flow speeds, the cavity assembly was oriented at 0, 5, 10, 20, 30, 40, 50, 60, 70, 80 and 90° about the Y-axis. The simulations were performed at normal barometric pressure (i.e., 101325 Pa). For more precise simulations, the actual temperature, pressure and even humidity of the environment in which the monitoring device is situated may be incorporated into the simulations. The absolute pressure at each of pressure sensors 20a-20i was simulated (i.e., calculated) with a 1 Pascal degree of accuracy (i.e., absolute pressure calculations were rounded to the nearest 1 Pascal to simulate limitations in the resolution of pressure sensor measurements). It is noted that the 1 Pascal degree of accuracy was chosen for simplicity, and a different degree of accuracy could be used in other simulations, such as in a simulation of a monitoring device using Infineon DPS310 Digital Barometric Pressure Sensors.

FIG. 7 depicts plot 62 of the logarithm of the difference between the maximum and minimum absolute pressures (i.e., $\log (P_{max}-P_{min})$) at the simulated flow speeds versus the rotational position of cavity assembly 12 about the Y-axis angle. It is noted that the pressure difference (i.e., $P_{max}-P_{min}$) is very dependent on the flow speed, making the pressure difference a good indicator of the flow speed.

For ease of understanding, the sensors that registered the maximum and minimum pressures at each of the Y-axis angle orientations of the cavity assembly are also recorded in table 63 below plot 62. It should be apparent that sensor "a" in table 63 corresponds to sensor 20a; sensor "i" in table 63 corresponds to sensor 20i, and so on. At a 0° rotation of the cavity assembly about the Y-axis, sensor 20a registered the maximum pressure, which is expected as the gas flow exerts the maximum force on cavity 32a. At a 90° rotation of the cavity about the Y-axis, opening 14i faces the gas flow. Sensor 20i registers the maximum pressure, which is expected as the gas flow exerts the maximum force on cavity 32i.

One important observation from plot 62 is that $\log (P_{max}-P_{min})$ for each flow speed is nearly constant over the various orientations of the cavity assembly about the Y-axis. Therefore, an approximation may be made that $\log (P_{max}-P_{min})$ for each flow speed is independent of the orientation of the cavity assembly about the Y-axis.

For flow speeds less than 2 m/s, $\log (P_{max}-P_{min})$ was not constant over the various orientations of the cavity assembly about the Y-axis (these results not depicted). The variation in $\log (P_{max}-P_{min})$ was likely not due to the varying orientations of the cavity assembly, but rather due to the rounding errors caused by the 1 Pascal accuracy of the measurements. For flow speeds less than 2 m/s, the simulations indicate that pressure sensors with a degree of accuracy less than 1 Pascal are needed.

Figure 8:
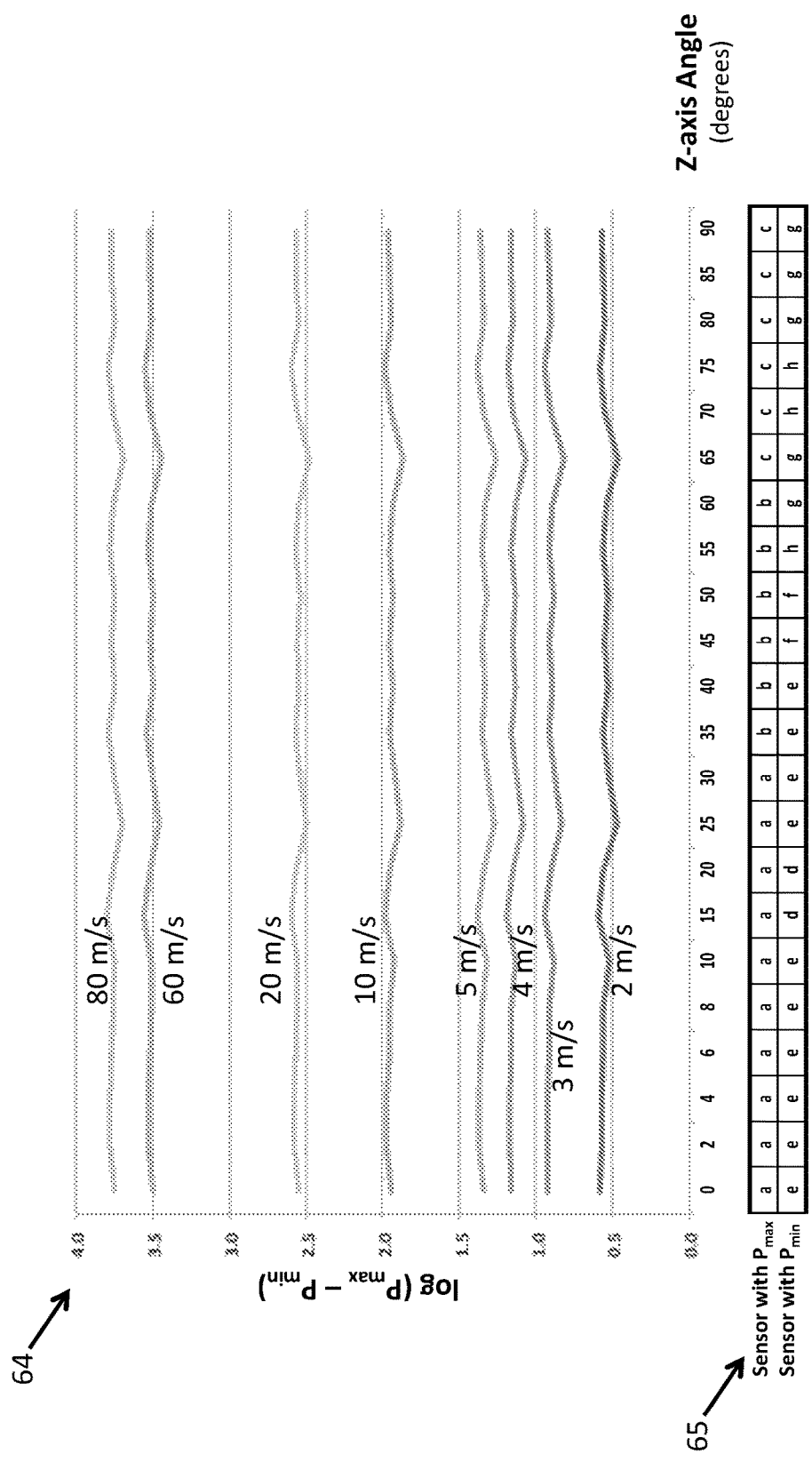
FIG. 8 depicts a plot of the logarithm of the difference between the maximum and minimum absolute pressures versus the rotational position of the cavity assembly about the Z-axis angle, in accordance with one embodiment.
Figure 9:
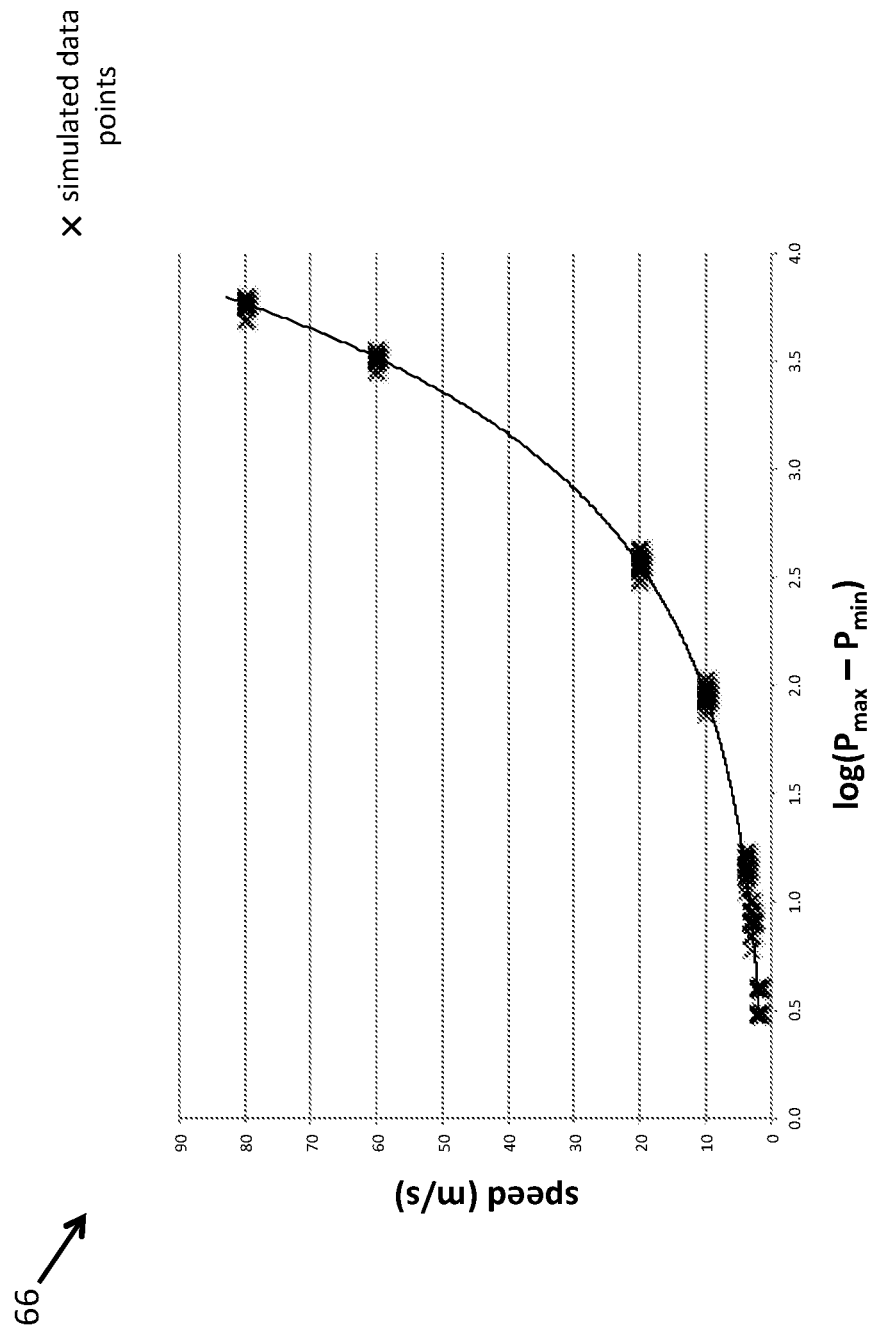
FIG. 9 depicts a plot of the gas flow speed versus the logarithm of the difference between the maximum and minimum absolute pressures, in accordance with one embodiment.

To generate the results of FIG. 8, simulations were performed for gas flow speeds of 2, 3, 4, 5, 10, 20, 60 and 80 m/s. For each of these flow speeds, the cavity assembly was oriented at 0, 2, 4, 6, 8, 10, 15, 20, 25, 30, 35, 40, 45, 50, 55, 60, 65, 70, 75, 80, 85 and 90° about the Z-axis. Due to device symmetry about the Z-axis, the results from 0-45° should suffice to characterize the full rotation through 360°, although for a more thorough analysis, the results were simulated from 0-90°.

The absolute pressure at each of pressure sensors 20a-20i was calculated with a 1 Pascal degree of accuracy (i.e., absolute pressure calculations were rounded to the nearest 1 Pascal). FIG. 8 depicts plot 64 of log ($P_{max}-P_{min}$) for the simulated flow speeds versus the rotational position of cavity assembly 12 about the Z-axis.

For ease of understanding, the sensors that registered the maximum and minimum pressures at each of the Z-axis angle orientations of the cavity assembly are also recorded in table 65 below plot 62. At a 0° rotation of the cavity assembly about the Z-axis, sensor 20a registered the maximum pressure, which is expected as the gas flow exerts the maximum force on cavity 32a. At a 45° rotation of the cavity assembly about the Z-axis, opening 14b faces the gas flow. Sensor 20b registers the maximum pressure, which is expected as the gas flow exerts the maximum force on cavity 32b.

One important observation from plot 64 is that log ($P_{max}-P_{min}$) for each flow speed is nearly constant over the various orientations of the cavity assembly about the Z-axis. Therefore, an approximation may be made that log ($P_{max}-P_{min}$) for each flow speed is independent of the orientation of the cavity assembly about the Z-axis.

For flow speeds less than 2 m/s, log ($P_{max}-P_{min}$) was not constant over the various orientations of the cavity assembly about the Z-axis (these results not depicted). Again, the variation was likely not due to the varying orientations of the cavity assembly, but rather due to the rounding errors caused by the 1 Pascal accuracy of the measurements. For flow speeds less than 2 m/s, the simulations once again indicate that pressure sensors with a degree of accuracy less than 1 Pascal are needed.

In plots 62 and 64, log ($P_{max}-P_{min}$) is nearly constant for each of the flow speeds not only within the plots, but also nearly constant across the plots. Therefore, the simulations reveal that the log ($P_{max}-P_{min}$) is substantially independent of the orientation of the cavity assembly (whether the rotation is about the X-, Y- or Z-axes). As a result, a mapping between (i) log ($P_{max}-P_{min}$) and (ii) the flow speed (independent of the orientation of the cavity assembly) may be formed, and such a mapping is depicted in FIG. 9.

In FIG. 9, log ($P_{max}-P_{min}$) is plotted for each of the flow speeds and for each of the Y- and Z-axes orientations (i.e., data points marked with an 'x'). A non-linear line was fitted to the data points (e.g., fitted using a non-linear least squares method), and such non-linear line approximates a mapping from log ($P_{max}-P_{min}$) to flow speed that is independent of the orientation of the cavity assembly. It is noted that the relationship between log ($P_{max}-P_{min}$) and flow speed being independent of the orientation of the cavity assembly may not hold for any cavity assembly. Rather the rotational independence property of the relationship may be a result of the placement of cavities about the cavity assembly. The more cavities and the more uniform the cavities are distributed about the cavity assembly, the more likely the rotational independence property of the relationship will hold.

It should now be apparent how the flow speed may be determined from the absolute pressure measurements. First, a mapping similar to the mapping depicted in plot 66 may be generated for a cavity assembly. Such mapping may be generated using computational fluid dynamic simulations (as discussed above) or using actual measurements. In the case of using actual measurements, plots 62 and 64 may first be generated using actual measurements (e.g., by placing a monitoring device at a particular orientation in a gas flow calibrated at a particular velocity, measuring absolute pressure using the pressure sensors of the monitoring device, calculating log ($P_{max}-P_{min}$)). The property of the log ($P_{max}-P_{min}$) being independent of the Y- and Z-axis orientation may be confirmed. Finally, a mapping from log ($P_{max}-P_{min}$) may be generated from plots 62 and 64, as discussed above. After the mapping from log ($P_{max}-P_{min}$) to flow speed has been generated, such mapping may be used to map a measured log ($P_{max}-P_{min}$) reading to a flow speed. If not already apparent, $P_{max}$ and $P_{min}$ are not constrained to be measured by any two particular ones of the pressure sensors. For instance, in a first measurement at time 1, $P_{max}$ and $P_{min}$ may be measured by sensors 20a and 20d, respectively, but in a second measurement at time 2 (e.g., following the change in the direction and/or speed of the gas flow), $P_{max}$ and $P_{min}$ may be measured by sensors 20a and 20f, respectively.

Figure 10:
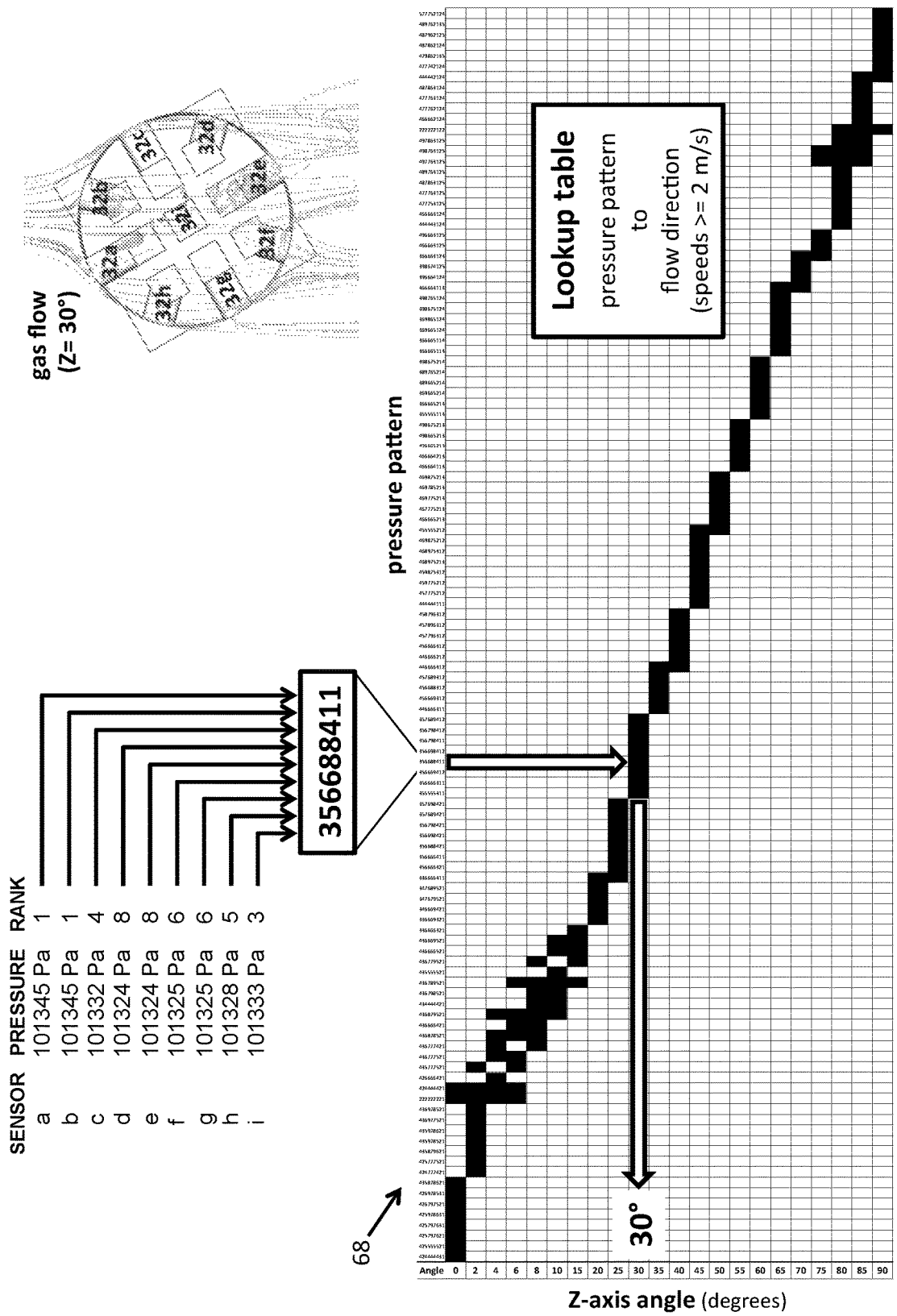
FIG. 10 depicts an example of how the gas flow direction may be determined from a set of absolute gas pressure measurements, in accordance with one embodiment.

FIG. 10 depicts an example of how the gas flow direction may be determined from a set of absolute gas pressure measurements, in accordance with one embodiment. As depicted in FIG. 10, pressure sensors may be ranked according to the magnitude of their respective absolute pressure measurements. In the example of FIG. 10, sensor 20a (corresponding to "sensor a") and sensor 20b (corresponding to "sensor b") both had the highest pressure measurement at 101345 Pa. Therefore, sensors 20a and 20b both received the ranking of "1". Sensor 20i (corresponding to "sensor i") had the third highest pressure measurement at 101332 Pa. Therefore, sensor 20i received the ranking of "3". It should be apparent how the remainder of the pressure sensors is ranked. After the pressure sensors are ranked (or ordered), the rankings (or orderings) of the pressure sensors may be mapped to a flow direction. In the example of FIG. 10, the rankings were concatenated into a vector (i.e., [3 5 6 6 8 8 4 1 1]), and the vector was mapped, via lookup table 68, to the flow direction of 30° (i.e., a 30° angle about the Z-axis). Such vector is referred to as a "pressure pattern" in FIG. 10, although in the specific example of FIG. 10, the values of the vector do not represent pressure measurements, but rather a ranking of the pressure sensors. In another embodiment (e.g., in FIG. 16), a pressure pattern may be constructed using pressure measurements (e.g., may be constructed using the column of pressure measurements under the heading "pressure" instead of using the column of rankings under the heading "rank" in FIG. 10).

Lookup table 68 was generated using computational fluid dynamic simulations, but also could be generated using actual measurements or machine learning techniques. In the case of fluid dynamic simulations, pressure measurements for pressure sensors 20a-20i may be calculated for a gas flow which flows past a monitoring device at a particular orientation. In the upper right portion of FIG. 10, a trace from a fluid dynamics simulation is shown with a gas flow at 30° about the Z-axis (i.e., with the 0° reference point being defined by gas flowing directly towards cavity 32a). The pressure sensors 20a-20i may be ranked according to the magnitude of their respective pressure measurements, and the pairing of a vector rankings and the gas flow direction may be stored in lookup table 68. Such process may be repeated for numerous gas flow directions to populate table 68. It is again noted that a 1 Pascal degree of accuracy in pressure measurements resulted in the minimum reliable flow speed to be 2 m/s. At lower flow speeds, rounding errors dominate and lead to unreliable data points. It is also noted the number of cavities resulted in a maximum angular resolution of the flow direction to be approximately 15°.

In the case of actual measurements, pressure measurements for pressure sensors 20a-20i may be measured for a gas flow which flows past a monitoring device at a particular orientation. The pressure sensors 20a-20i may be ranked according to the magnitude of their respective pressure measurements, and the pairing of a vector of rankings and the gas flow direction may likewise be stored in lookup table 68. Such process may be repeated for numerous gas flow directions to populate table 68.

As there are many more possible rankings than possible flow direction (assuming 5° granularity in flow directions), it is not unlikely that there will be a vector of rankings that is not mapped to a flow direction in table 68. In such case, machine learning may be used to infer an appropriate flow direction for a particular vector of rankings. The training of a model, and the application of the model in a machine learning algorithm is described below in FIG. 18.

It is noted that the flow direction determination was described above with respect to a flow direction in the X-Y plane (i.e., an azimuth angle or an angular orientation of the gas flow with respect to the Z-axis). In other embodiments, similar techniques could be applied to further determine the flow direction with respect to the Y-Z plane (i.e., angular orientation of the gas flow with respect to the X-axis), and the flow direction with respect to the X-Z plane (i.e., angular orientation of the gas flow with respect to the Y-axis). For instance, a table (similar to table 68) may be generated and used to map a pressure pattern to a Y-axis angle, and a further table (similar to table 68) may be generated and used to map a pressure pattern to an X-axis angle.

Figure 11:
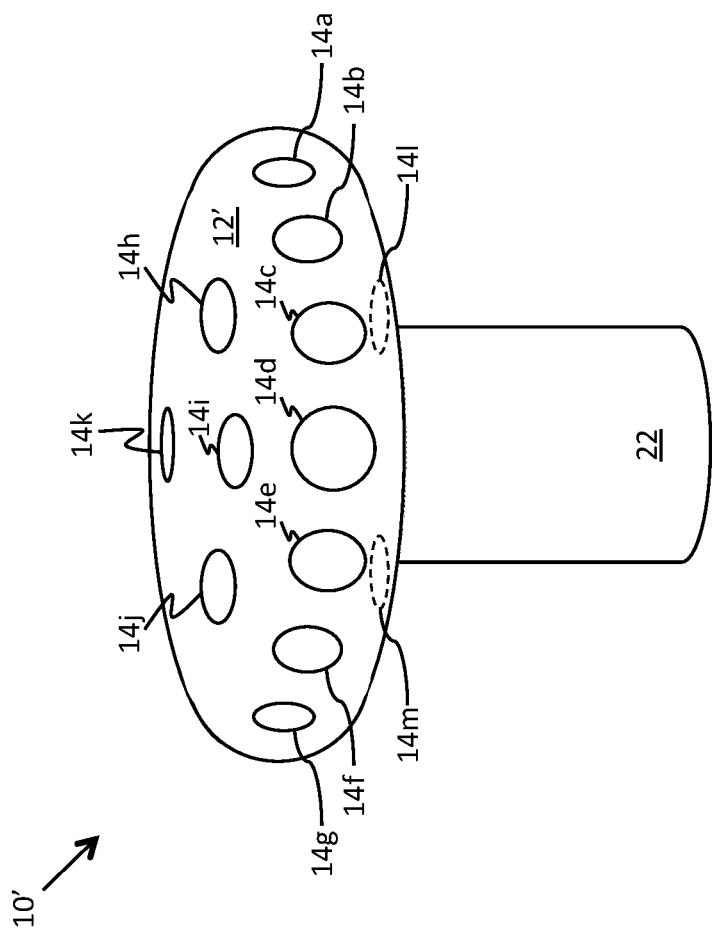
FIG. 11 depicts a perspective view of the monitoring device, in accordance with an alternative embodiment.

FIG. 11 depicts a perspective view of monitoring device 10', in accordance with an alternative embodiment. Cavity assembly 12' comprises many more cavities than cavity assembly 12. Of the visible features, openings 14a, 14b, 14c, 14d, 14e, 14f and 14g may be disposed on flow-facing surface 13 about the equator of cavity assembly 12'; openings 14h, 14i, 14j and 14k may be disposed on flow-facing surface 13 above the equator of cavity assembly 12'; and openings 14l and 14m may be disposed on flow-facing surface 13 below the equator of cavity assembly 12'. It is understood that there are many more openings on flow-facing surface 13 which are not visible in the particular orientation of cavity assembly 12' in FIG. 11. Base portion 22 is disposed adjacent to cavity assembly 12', and sensor support 18 is not visible in the perspective view of FIG. 11. The increased number of cavities (and in turn the increased number of pressure sensors) provides the advantages of increased accuracy in term of the flow speed and flow direction measurements (i.e., increased flow direction resolution relative to the X-, Y-, and/or Z-axes).

Figure 12:
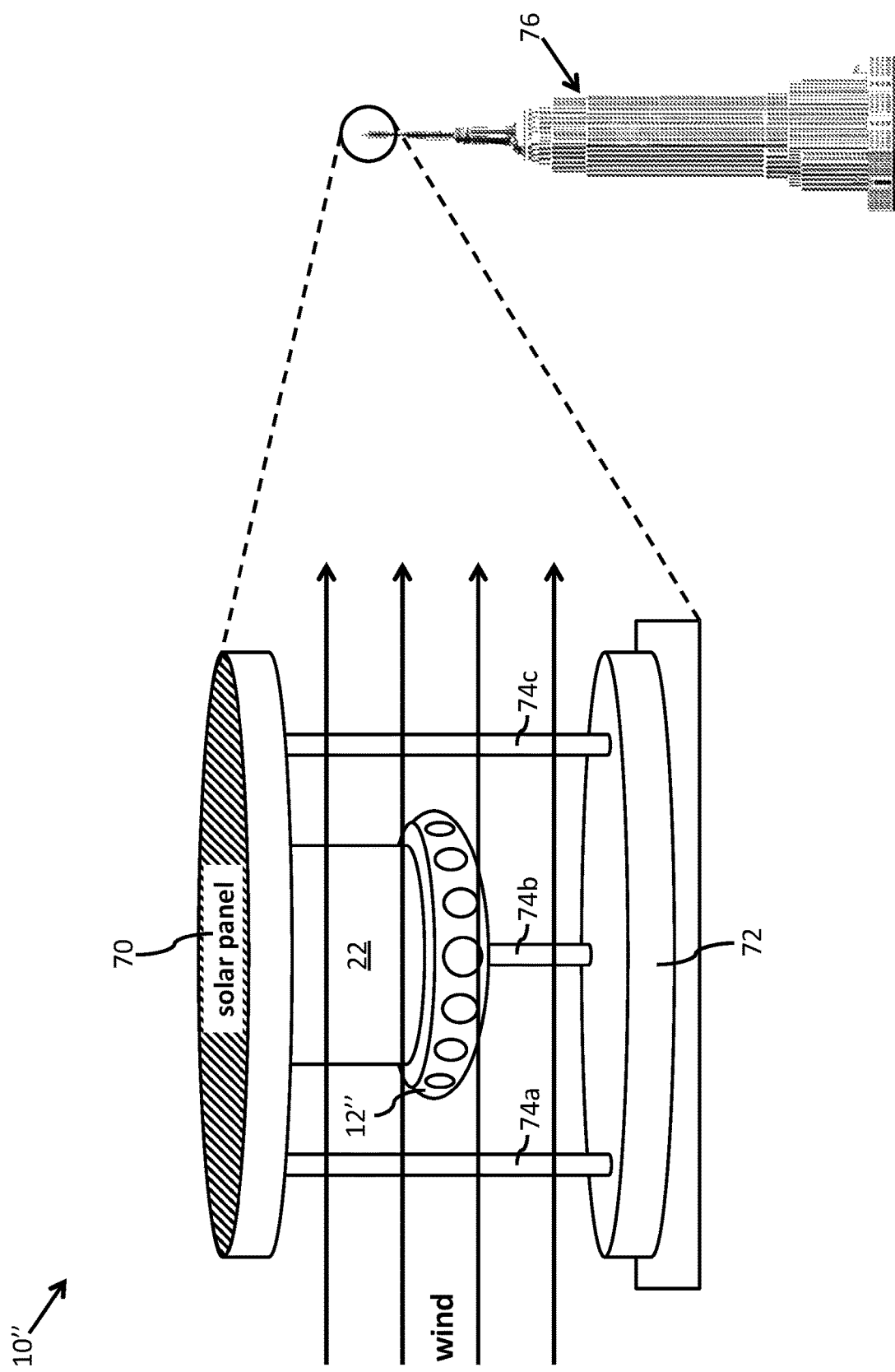
FIG. 12 depicts a perspective view of a monitoring device, specifically configured to measure the speed and direction of wind, in accordance with one embodiment.

FIG. 12 depicts a perspective view of monitoring device 10'', configured specifically to measure the speed and direction of wind, in accordance with one embodiment. Monitoring device 10'' comprises cavity assembly 12'', sensor support (not depicted) and base portion 22. Such components have a similar functionality of the corresponding components described in FIG. 1, and will not be described further for conciseness. Monitoring device 10'' may further comprise solar panel 70, which is configured to supply power to the electronic circuitry of base portion 22. Solar panel 70 may be mounted on base portion 22, and pillars 74a and 74c. Pillars 74a and 74c may be secured onto pedestal 72. An additional pillar 74b may secure cavity assembly 12'' to pedestal 72. The entire monitoring device 10'' may be mounted on building 76 (or other structure) to measure the wind speed and direction in the vicinity of building 76. In addition to supplying electrical power, solar panel 70 may protect cavity assembly 12'' and base portion 22 from the elements (e.g., rain, snow, etc.) If not immediately apparent, all of the components of monitoring device 10'' are configured to be stationary (i.e., there are no moving components). Therefore, any movement sensed by monitoring device 10'' will be due to the movement of the wind, and not due to the movement of monitoring device 10''. To allow for operation at night, solar panel 70 may comprise a rechargeable battery (which could also be situated in base portion 22). For extra durability in the environment, gas permeable screens may be disposed over each of the openings of cavity assembly 12'', which would block debris (e.g., dust), but at the same time permit gas to flow into and out of each of the cavities.

Figure 13:
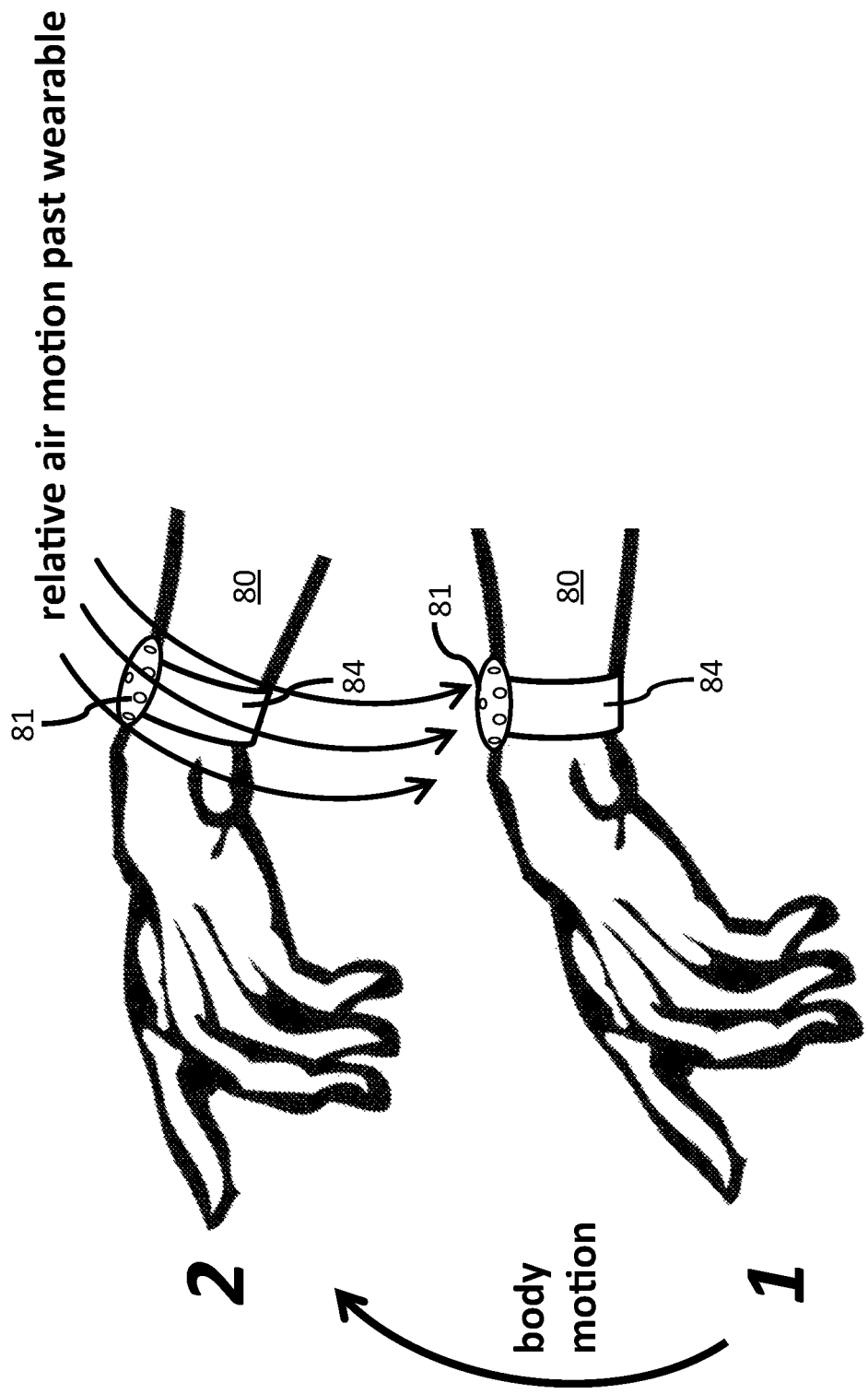
FIG. 13 depicts the monitoring device mounted on a wristband, the monitoring device configured to measure the speed and direction of a person's wrist, in accordance with one embodiment.

FIG. 13 depicts monitoring device 81 mounted on wristband 84, in accordance with one embodiment. Wristband 84 is designed to be worn on wrist 80 (or other body part) of a person. In a still environment (i.e., no wind), the gas flow speed measured by monitoring device 81 will be attributable to the motion of wrist 80, and hence the flow speed can be used to infer the speed of wrist 80 (or other body part). More generally, the monitoring device 81 may be mounted onto an article of clothing, a helmet, shoes, or any other wearable article. Even more generally, monitoring device may be mounted on any device which moves (e.g., drones, bicycles, automobiles, boats, trains, etc.).

Figure 14:
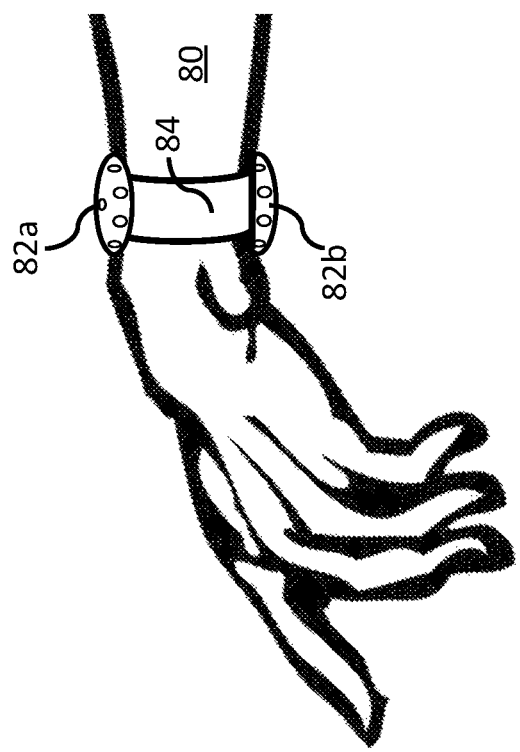
FIG. 14 depicts two monitoring devices mounted on a wristband, the monitoring devices configured to measure the speed and direction of a person's wrist, in accordance with one embodiment.

FIG. 14 depicts monitoring devices 82a and 82b mounted on wristband 84 in accordance with one embodiment. While not clearly visible, cavity assembly of monitoring device 82a may be configured to have a cavity opening positioned at the "north pole", and cavity assembly of monitoring device 82b may be configured to have a cavity opening positioned at the "south pole", allowing for a more precise determination of the speed of wrist 80. In one embodiment, monitoring devices 82a and 82b may independently compute the speed of wrist 80, and such independent determinations of the speed can be combined (e.g., averaged together). In an alternative embodiment, the pressure measurements of both monitoring devices 82a and 82b may be first aggregated together, before computing the flow speed.

In a further embodiment (not depicted), the principles of the present invention may be applied to large-scale applications (e.g., agricultural, architectural, or industrial applications). A network of the monitoring devices can be distributed to characterize the environment over a region (e.g., a field or a factory). The devices can be networked (e.g., via a mesh network) to propagate data to a central network node to be gathered for analysis. Such analysis could improve processes that are influenced by the movement of air (e.g., fighting of a forest fire, installation and maintenance of wind turbines, etc.).

In a further embodiment, it is contemplated that the speed information determined by a monitoring device may be supplied to a controller (not depicted), which may aggregate several inputs of movement/position/velocity (e.g., measured via accelerometer, gyroscope, etc.) and utilize sensor fusion to compute a more precise determination of the speed and/or position of a person or device.

Figure 15:
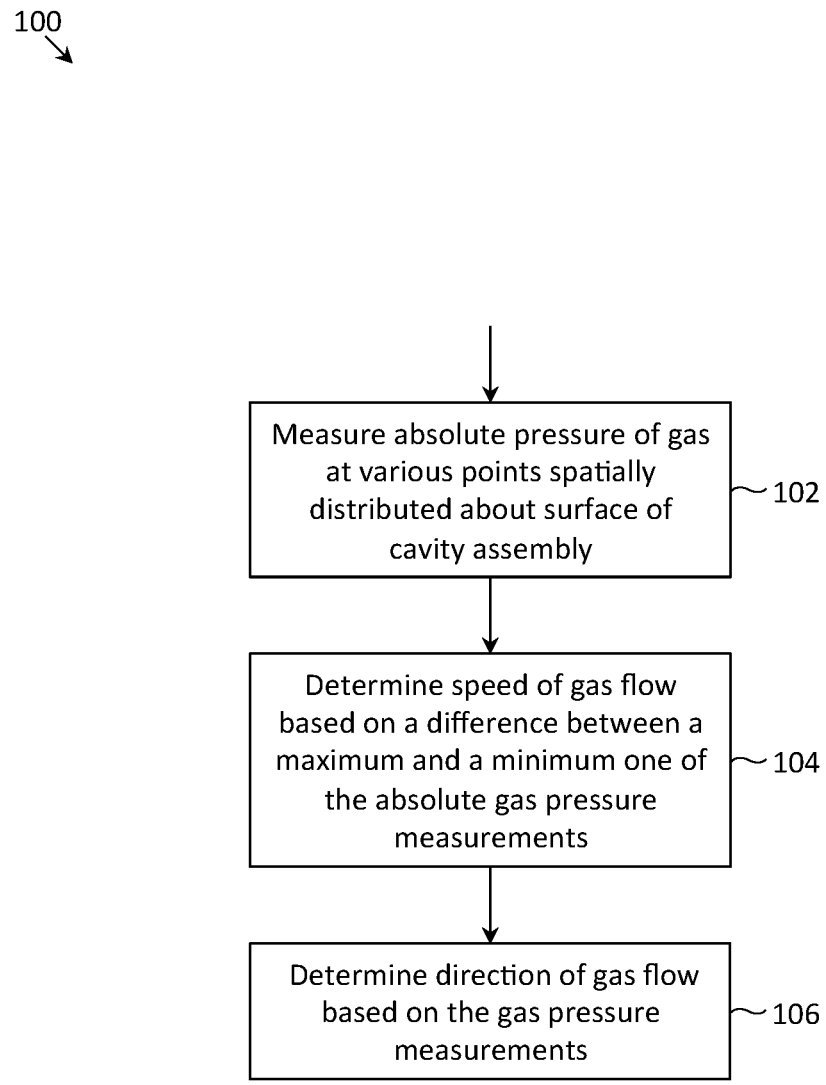
FIG. 15 depicts a flow diagram of a process to determine a speed and a direction of a gas flow based on gas pressure measurements, in accordance with one embodiment.

FIG. 15 depicts flow diagram 100 of a process to determine a speed and a direction of a gas flow based on gas pressure measurements, in accordance with one embodiment. At step 102, the absolute pressure of a gas flow may be measured at various points spatially distributed about a surface of a cavity assembly. Such measurements have been described in detail above with respect to FIG. 1. At step 104, the flow speed of a gas may be determined based on a difference between a maximum and a minimum one of the absolute gas pressure measurements. Such determination may utilize a mapping between log $(P_{max}-P_{min})$ and flow speed, as described in FIG. 9. Finally, at step 106, the flow direction may be determined based on the plurality of gas pressure measurements. Such determination may utilize a mapping between rankings of pressure sensor measurements and flow directions, as described in FIG. 10. Further techniques to determine the flow direction are described below in FIGS. 16-18.

Figure 16:
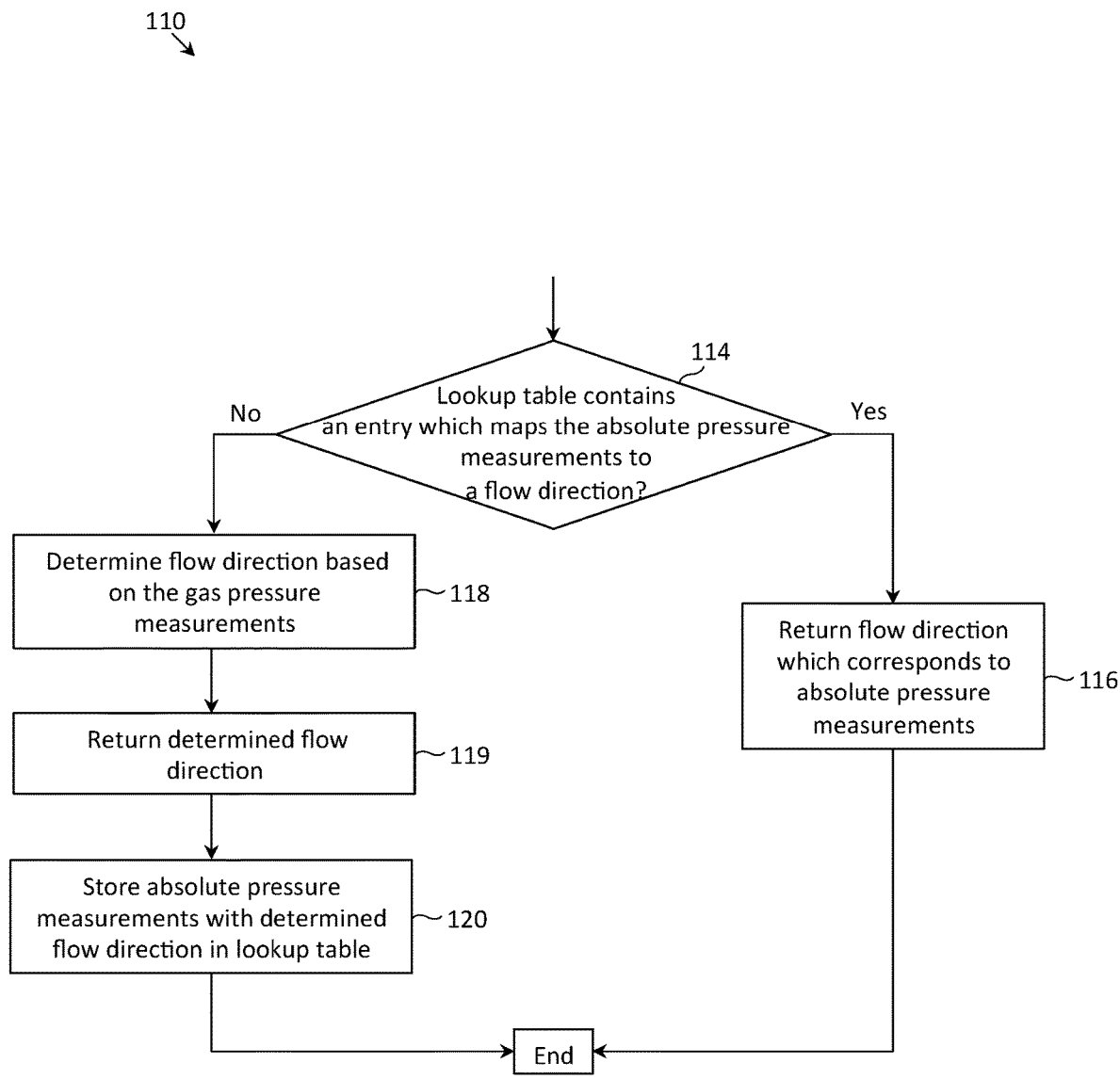
FIG. 16 depicts a flow diagram of a process to determine a direction of a gas flow based on gas pressure measurements, in accordance with one embodiment.

FIG. 16 depicts flow diagram 110 of a process to determine a direction of a gas flow based on gas pressure measurements, in accordance with one embodiment. At step 114, a determination is made as to whether a lookup table contains an entry which maps the absolute pressure measurements (i.e., generally referred to as a pressure pattern) to a flow direction. If so, the flow direction which corresponds to the rounded absolute pressure measurements is returned (step 116). If not, the flow direction may be determined based on the gas pressure measurements (step 118). Such determination may utilize the machine learning techniques described below in FIG. 18. After the flow direction has been determined, the determined flow direction may be returned (step 119), and the absolute pressure measurements and the determined flow direction may be stored in the lookup table (step 120).

Figure 17:
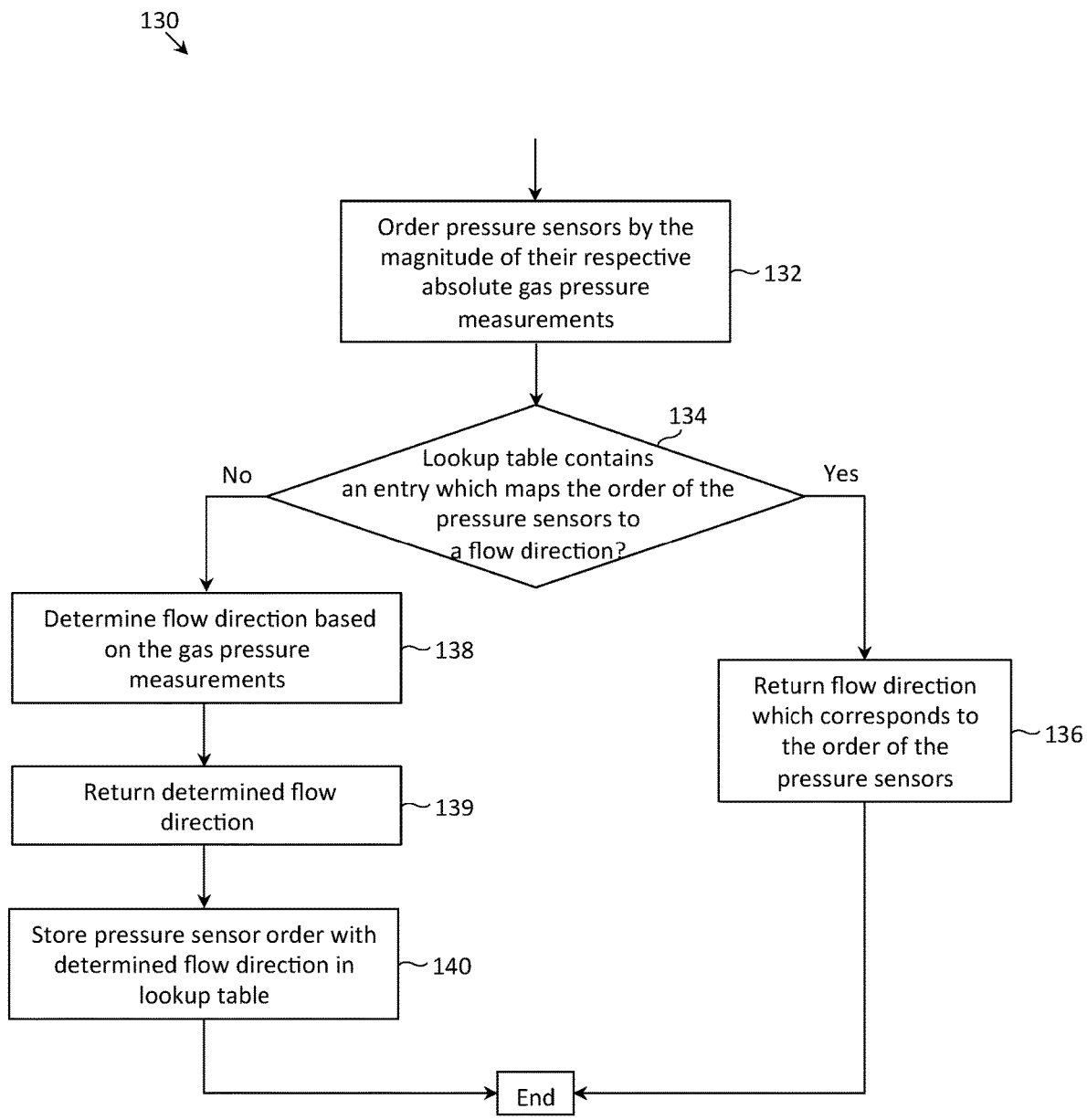
FIG. 17 depicts a flow diagram of a process to determine a direction of a gas flow based on gas pressure measurements, in accordance with one embodiment.

FIG. 17 depicts flow diagram 130 of a process to determine a direction of a gas flow based on gas pressure measurements, in accordance with one embodiment. Such process was already described with respect to FIG. 10, but will be described again in flow diagram 130 for completeness. At step 132, the pressure sensors may be ordered by the magnitude of their respective absolute gas pressure measurements. At step 134, a determination may be made as to whether a lookup table contains an entry which maps the order of the pressure sensors (i.e., generally referred to as a pressure pattern) to a flow direction. If so, the flow direction which corresponds to the order of the pressure sensors may be returned (step 134). If not, the flow direction may be determined based on the gas pressure measurements (step 138). Again, such determination may utilize the machine learning techniques described below in FIG. 18. After the flow direction has been determined, the determined flow direction may be returned (step 139), and the pressure sensor order and the determined flow direction may be stored in the lookup table (step 140).

Figure 18:
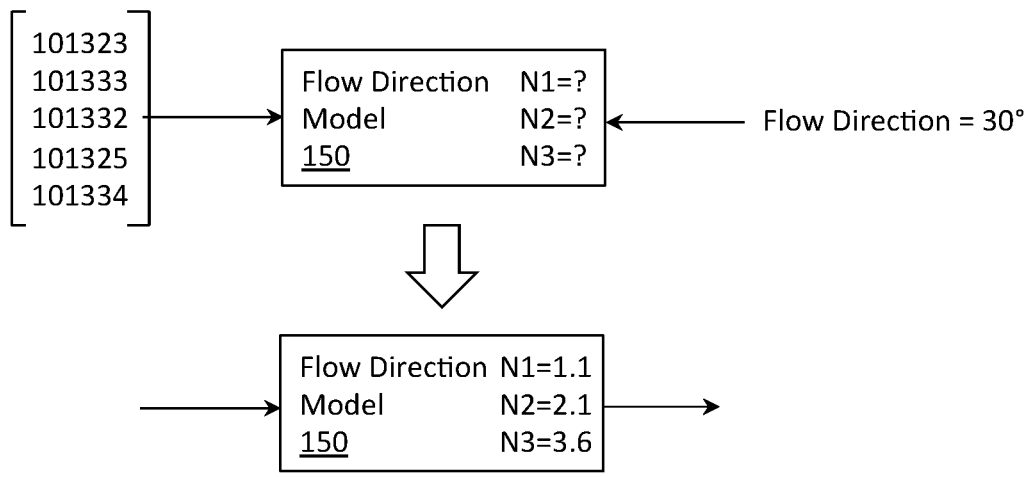
FIG. 18 depicts an example of a process to train and apply a model that is used to determine a direction of a gas flow based on gas pressure measurements, in accordance with one embodiment.
Figure 18:
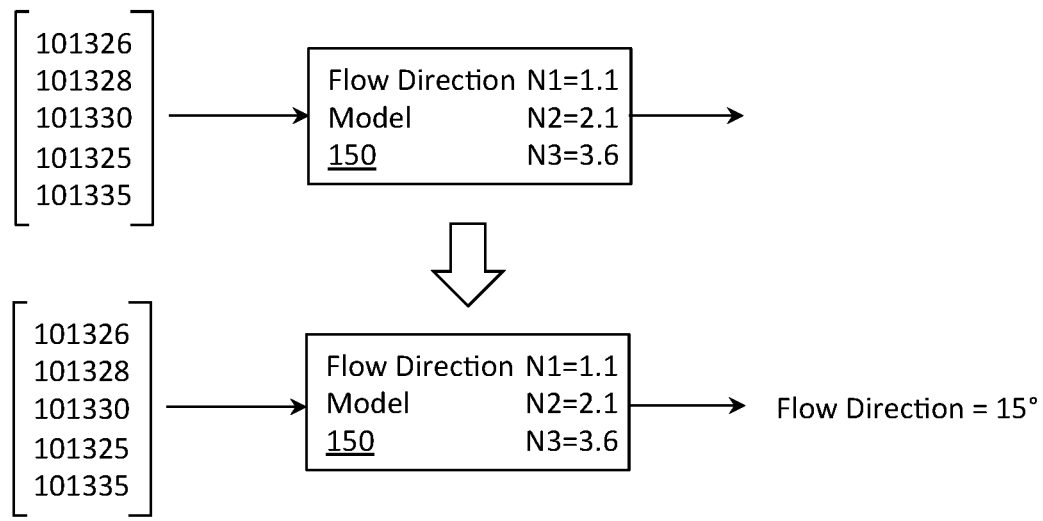

FIG. 18 depicts an example of a process to train and apply a model that is used to determine a direction of a gas flow based on gas pressure measurements, in accordance with one embodiment. Flow direction model 150 may comprise a plurality of parameters (e.g., N1, N2 and N3). In the model training phase, known pairings between pressure measurements and flow directions may be provided to train flow direction model 150. In the example of FIG. 18, the known pairing of (pressure measurements=[101323 Pa, 101333 Pa, 101332 Pa, 101325 Pa, 101334 Pa], flow direction=30°) is provided to train flow direction model 150. Such training data may be either computed via flow dynamics simulations or determined via direct measurements. While only one training data point is provided in the example of FIG. 18, many more training data points may be employed in practice. At the conclusion of the model training, parameters of flow direction model 150 may be set to "learned" parameter values (e.g., N1=1.1, N2=2.1, N3=3.6]).

In the application of flow direction model 150, a vector of pressure measurements may be provided as input to flow direction model 150, and flow direction model 150 returns a flow direction. In the example provided in FIG. 18, pressure measurements [101326 Pa, 101328 Pa, 101330 Pa, 101325 Pa, 101335 Pa] are provided as input to flow direction model 150 and flow direction model 150 returns the flow direction 15°. In an alternative embodiment, the input to flow direction model 150 may be the ranking of pressure sensors instead of pressure measurements.

Figure 19:
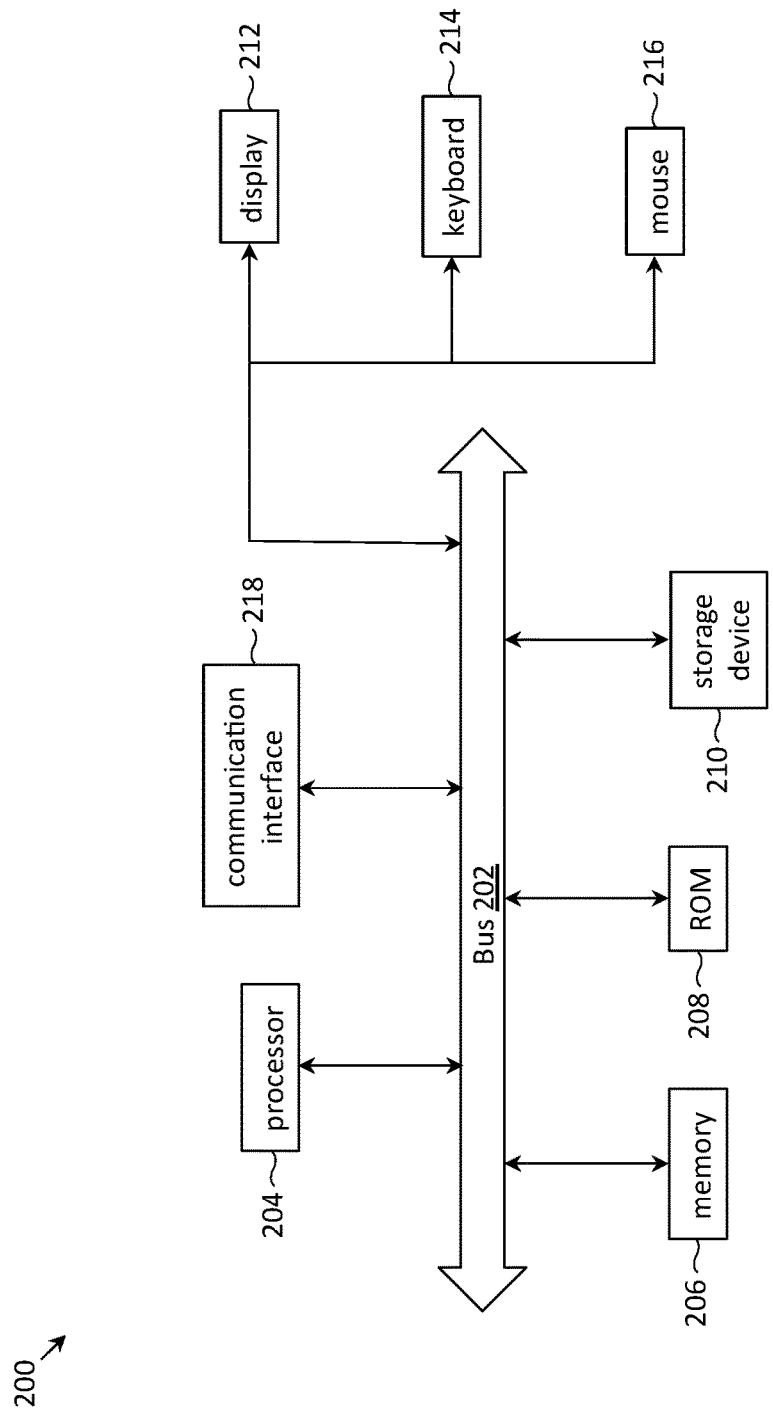
FIG. 19 depicts components of a computer system in which computer readable instructions instantiating the methods of the present invention may be stored and executed.

FIG. 19 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 19 provides an example of a system 200 that may be representative of any of the computing systems (e.g., base portion 22) discussed herein. Examples of system 200 may include a smartphone, a desktop, a laptop, a mainframe computer, an embedded system, etc. Note, not all of the various computer systems have all of the features of system 200. For example, certain ones of the computer systems discussed above may not include a display inasmuch as the display function may be provided by a client computer communicatively coupled to the computer system or a display function may be unnecessary. Such details are not critical to the present invention.

System 200 includes a bus 202 or other communication mechanism for communicating information, and a processor 204 coupled with the bus 1002 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, for example a hard disk, flash memory-based storage medium, or other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackpad, or similar input device for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units may be used in place of or in combination with processor 204 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 may provide a two-way data communication channel with a computer network, which provides connectivity to and among the various computer systems discussed above. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet. It is noted that the components of system 200 may be located in a single device or located in a plurality of physically and/or geographically distributed devices.

Thus, methods and systems for measuring the speed and direction of a gas flow have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A monitoring device, comprising:
a cavity assembly with a plurality of cavities;
a plurality of sensors; and
a sensor support that supports the plurality of sensors,
wherein the cavity assembly has a first interface that is formed by a sensor-facing surface with a first plurality of openings,
wherein each one of the first plurality of openings is fluidly connected with one of the plurality of cavities,
wherein the sensor support has a second interface that is formed by a top surface of the sensor support and the plurality of sensors,
wherein the first interface is geometrically complementary to the second interface, and
wherein the second interface is geometrically complementary to the first interface.

2. The monitoring device of claim 1, wherein the sensor-facing surface is a planar surface.

3. The monitoring device of claim 1, wherein the top surface of the sensor support is a planar surface.

4. The monitoring device of claim 1, wherein the plurality of sensors is disposed on the top surface of the sensor support.

5. The monitoring device of claim 1, wherein the plurality of sensors is disposed in a single plane.

6. The monitoring device of claim 1, wherein each one of the first plurality of openings from the first interface is configured to receive one of the plurality of sensors from the second interface.

7. The monitoring device of claim 1, wherein a portion of the sensor-facing surface abuts the top surface of the sensor support.

8. The monitoring device of claim 1, wherein the top surface of the sensor support seals the first plurality of openings.

9. The monitoring device of claim 1, wherein the cavity assembly includes a second plurality of openings, wherein each one of the second plurality of openings is disposed on a flow-facing surface of the cavity assembly and is fluidly connected to one of the plurality of cavities.

10. The monitoring device of claim 9, wherein the flow-facing surface is a three-dimensional surface that is convex and radially symmetric.

11. The monitoring device of claim 1, further comprising a base portion that is secured to the sensor support, wherein the base portion includes a controller and a transceiver.

12. The monitoring device of claim 11, where the sensor support is disposed between the cavity assembly and the base portion.

13. The monitoring device of claim 11, wherein the controller is configured to receive at least one absolute gas pressure measurement from each of the sensors, and determine a speed and a direction of a gas flow from the absolute gas pressure measurements.

14. The monitoring device of claim 13, wherein the transceiver is configured to receive the speed and direction of the gas flow from the controller and wirelessly transmit the speed and direction of the gas flow to a base station located remotely from the monitoring device.

15. The monitoring device of claim 1, wherein the plurality of sensors includes nine sensors that are arranged in a 3 by 3 grid.

16. The monitoring device of claim 1, wherein the first plurality of openings includes nine openings that are arranged in a 3 by 3 grid.

17. The monitoring device of claim 1, wherein the plurality of cavities includes a plurality of cylindrical channels.

18. The monitoring device of claim 1, wherein the plurality of cavities includes a plurality of channels, and wherein at least two of the channels have lengths that are different from one another.

19. The monitoring device of claim 1, wherein the plurality of sensors includes pressure sensors.

20. The monitoring device of claim 19, wherein the pressure sensors are configured to measure absolute pressure.

* * * * *